United States Patent
Mitarai et al.

(10) Patent No.: US 9,697,441 B2
(45) Date of Patent: Jul. 4, 2017

(54) FEATURE SELECTION METHOD AND APPARATUS, AND PATTERN DISCRIMINATION METHOD AND APPARATUS

(75) Inventors: Yusuke Mitarai, Tokyo (JP); Masakazu Matsugu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 13/451,817

(22) Filed: Apr. 20, 2012

(65) Prior Publication Data
US 2012/0269426 A1 Oct. 25, 2012

(30) Foreign Application Priority Data
Apr. 20, 2011 (JP) ................................. 2011-094372

(51) Int. Cl.
*G06K 9/62* (2006.01)

(52) U.S. Cl.
CPC ......... *G06K 9/6231* (2013.01); *G06K 9/6285* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 2003/0200188 A1* | 10/2003 | Moghaddam | ........ | G06K 9/6256 706/25 |
| 2007/0165951 A1* | 7/2007 | Akahori | ............. | G06K 9/00281 382/195 |
| 2008/0166026 A1* | 7/2008 | Huang | ............... | G06K 9/00281 382/118 |
| 2009/0046172 A1* | 2/2009 | Rao | ...................... | G06K 9/6269 348/226.1 |

(Continued)

FOREIGN PATENT DOCUMENTS

| | | |
|---|---|---|
| JP | H07-129770 A | 5/1995 |
| JP | 2006-268825 A | 10/2006 |
| JP | 2009-43280 A | 2/2009 |

OTHER PUBLICATIONS

Beis, J.S., Lowe, D.G., "Learning indexing functions for 3-D model-based object recognition," 1994 IEEE Computer Society Conference on Computer Vision and Pattern Recognition, Jun. 21-23, 1994, 5 pages.*

(Continued)

*Primary Examiner* — Sumati Lefkowitz
*Assistant Examiner* — Ryan P Potts
(74) *Attorney, Agent, or Firm* — Carter, DeLuca, Farrell & Schmidt, LLP

(57) ABSTRACT

A feature selection apparatus, which selects features to be used to discriminate an object by a discriminator using learning data including the object, extracts a plurality of partial data from the learning data, and obtains discrimination values obtained by controlling the discriminator to (Continued)

process the plurality of extracted partial data as features of the plurality of partial data. The feature selection apparatus evaluates the obtained features based on discrimination degrees on a discrimination space defined by the discriminator, and selects features to be used to discriminate the object from a plurality of features obtained in association with the plurality of partial data based on an evaluation result.

20 Claims, 11 Drawing Sheets

(56) References Cited

U.S. PATENT DOCUMENTS

| | | | |
|---|---|---|---|
| 2009/0202114 A1* | 8/2009 | Morin | A63F 13/12 382/118 |
| 2011/0176725 A1* | 7/2011 | Homma | G06K 9/6228 382/159 |

OTHER PUBLICATIONS

Alexander Zien, Ulf Brefeld, and Tobias Scheffer., "Transductive support vector machines for structured variables," Proceedings of the 24th international conference on Machine learning (ICML '07), 2007, Zoubin Ghahramani (Ed.). ACM, New York, NY, USA, 8 pages.*

Jigang Wang, Predrag Neskovic, Leon N. Cooper, "Improving nearest neighbor rule with a simple adaptive distance measure," Pattern Recognition Letters, vol. 28, Issue 2, Jan. 15, 2007, 7 pages.*

Moreels, Pierre. Perona, Pietro, "Evaluation of Features Detectors and Descriptors based on 3D Objects," International Journal of Computer Vision, Sep. 2006, 22 pages.*

Breiman, Leo. "Random forests." Machine learning 45.1 (2001): 5-32. 33 pages.*

Kovesi, Peter. "Decision Trees, Random Forests and Random Ferns." ANU College of Engineering & Computer Science. Apr. 8, 2011. Web. Mar. 21, 2015. <http://cvpr11.cecs.anu.edu.au/files/RandomForests.pdf>. 41 pages.*

Napoleon, Thibault and Jurie, Frederic. "Face recognition Facial traits and random ferns." University of Caen Basse-Normandie—GREYC. Sep. 22, 2011. Web. Oct. 9, 2015. <http://vision.isen-bretagne.fr/~napoleon/documents/research/KeynoteRepere10_Thibault_Napoleon.pdf>. 6 pages.*

Vincent Lepetit and Pascal Fua, "Keypoint Recognition Using Randomized Trees", IEEE Transactions on Pattern Analysis and Machine Intelligence, vol. 28, No. 9, pp. 1465-1479, Sep. 2006.

Paul Viola and Michael Jones, "Rapid Object Detection using a Boosted Cascade of Simple Features", Proceedings IEEE Conference on Computer Vision and Pattern Recognition, vol. 1, pp. 511-518, Dec. 2001.

Mustafa Ozuysal, Michael Calonder, Vincent Lepetit and Pascal Fua, "Fast Keypoint Recognition using Random Ferns", IEEE Transactions on Pattern Analysis and Machine Intelligence, vol. 32, No. 3, pp. 448-461, Mar. 2010.

L. Breiman, "Bagging Predictors", Machine Learning, 24, pp. 123-140, 1996.

Japanese Office Action issued in corresponding application No. 2011-094372 on Jan. 9, 2015.

Villamizar, M. et al. "Efficient Rotation Invariant Object Detection using Boosted Random Ferns," 8 pages. (2010).

* cited by examiner

F I G. 3
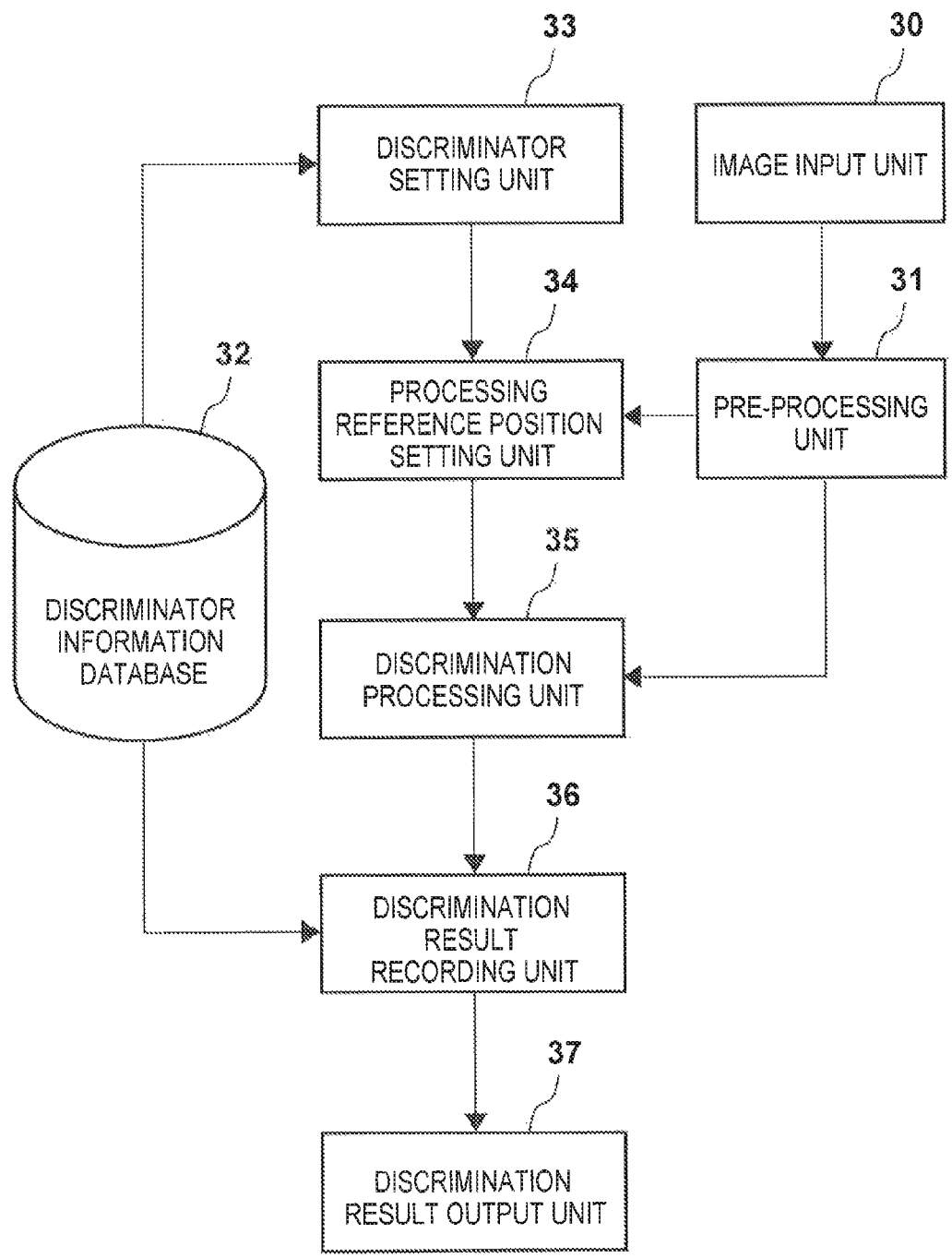

FEATURE SELECTION METHOD AND APPARATUS, AND PATTERN DISCRIMINATION METHOD AND APPARATUS

BACKGROUND OF THE INVENTION

Field of the Invention

The present invention relates to a feature selection method and apparatus for selecting features useful for pattern discrimination from a plurality of features in data. Also, the present invention relates to a pattern discrimination method and apparatus for classifying input data to be discriminated including a plurality of features into a predetermined class using the features selected by such feature selection method and apparatus.

Description of the Related Art

A pattern discrimination method for classifying data into a predetermined class by identifying attributes of data using partial features of data including a plurality of features, and combining the pieces of identified information has been proposed. Such pattern discrimination method has a merit, that is, robustness against data loss, variations, and the like. For this reason, various methods such as Japanese Patent Laid-Open No. 2009-43280 (to be referred to as patent literature 1 hereinafter), "Vincent Lepetit and Pascal Fua, "Keypoint Recognition Using Randomized Trees", IEEE Transactions on Pattern Analysis and Machine Intelligence, Vol. 28, No. 9, pp. 1465-1479, September 2006" (to be referred to as non-patent literature 1 hereinafter), and the like have been proposed.

Since the discrimination performance of such pattern discrimination method generally depends on partial features of data to be used in discrimination, partial features to be used from data must be selected appropriately. For example, with the method proposed by patent literature 1, discrimination precision of a pattern discrimination method is evaluated every time partial features to be used are changed, and partial features which can enhance the discrimination precision of the pattern discrimination method are selected based on the evaluation result. In non-patent literature 1, a large number of predetermined keypoints are detected from image data, and keypoints, which can be stably detected with high possibility even in a situation in which various variations have been given, are selected as partial features.

The partial feature selection method in the method described in patent literature 1 is called a Wrapper method in the technical field of feature selection. It is known that the Wrapper method is more likely to select appropriate features when test data enough to evaluate the discrimination precision exist. However, the Wrapper method suffers a problem of very high processing cost required for feature selection. On the other hand, when sufficient test data do not exist, so-called over-learning occurs.

On the other hand, in the partial feature selection method described in non-patent literature 1, features are evaluated using a separately defined evaluation scale in place of the final discrimination precision of the pattern discrimination method, and features are selected based on that evaluation value. Such method is called a Filter method in the technical field of feature selection. The Filter method generally has a merit of lower processing cost than the Wrapper method. However, with the Filter method, the evaluation scale required to evaluate features has to be separately defined, and inappropriate definition disturbs appropriate feature selection. For example, the method of non-patent literature 1 uses the high possibility of stable detection as the evaluation scale of features, as described above, but does not consider whether or not these features are discriminable from other features. However, with the pattern discrimination method of non-patent literature 1, whether or not these features are normally classified as corresponding features is associated with the final discrimination precision. For this reason, when target data includes many features which can be stably detected but are hardly discriminated from other features, feature selection that can enhance the final discrimination precision cannot be realized with high possibility.

A framework using AdaBoost described in "Paul Viola and Michael Jones, "Rapid Object Detection using a Boosted Cascade of Simple Features", Proceedings IEEE Conference on Computer Vision and Pattern Recognition, Vol. 1, pp. 511-518, December 2001" (to be referred to as non-patent literature 2 hereinafter) is also considered as one of partial feature selection methods. The framework using the AdaBoost is close to that of the Wrapper method since the framework uses the discrimination precision of element discriminators (so-called weak learners) included in a discriminator used in the final pattern discrimination method in evaluation. For this reason, although the processing cost is lower than the normal Wrapper method, required processing cost is still high. As in the Wrapper method, when sufficient test data required to evaluate element discriminators do not exist, over-learning occurs.

In this manner, a method which can select features suited to pattern discrimination from those in data with lower processing cost even when sufficient test data do not exist is demanded.

SUMMARY OF THE INVENTION

The present invention has been made in consideration of the aforementioned problems, and has as its object to provide a feature selection method and apparatus, which can select features suited to pattern discrimination from those included in data with lower processing cost even when sufficient test data do not exist. Also, the present invention has as its object to provide a pattern discrimination method and apparatus, which can classify data to be discriminated into a predetermined class using the features selected by such feature selection method and apparatus.

According to one aspect of the present invention, there is provided a feature selection method of selecting features to be used to discriminate an object by a discriminator using learning data including the object by an information processing apparatus, the method comprising: an extraction step of extracting a plurality of partial data from the learning data; an obtaining step of obtaining discrimination values obtained by controlling the discriminator to process the plurality of partial data extracted in the extraction step as features of the plurality of partial data; an evaluation step of evaluating the features obtained in the obtaining step based on discrimination degrees on a discrimination space defined by the discriminator; and a selection step of selecting features to be used to discriminate the object from a plurality of features obtained in association with the plurality of partial data based on an evaluation result in the evaluation step.

Also, according to another aspect of the present invention, there is provided a pattern discrimination method for discriminating an object in data using features selected by the above-described feature selection method, and a discriminator, the method comprising: a step of obtaining discrimination values by applying the discriminator to a plurality of partial data obtained from the data; and a step of classifying the data to a predetermined class by comparing the obtained discrimination values and the features.

Also, according to another aspect of the present invention, there is provided a feature selection apparatus for selecting features to be used to discriminate an object by a discriminator using learning data including the object, the apparatus comprising: an extraction unit configured to extract a plurality of partial data from the learning data; an obtaining unit configured to obtain discrimination values obtained by controlling the discriminator to process the plurality of partial data extracted by the extraction unit as features of the plurality of partial data; an evaluation unit configured to evaluate the features obtained by the obtaining unit based on discrimination degrees on a discrimination space defined by the discriminator; and a selection unit configured to select features to be used to discriminate the object from a plurality of features obtained in association with the plurality of partial data based on an evaluation result of the evaluation unit.

Furthermore, according to another aspect of the present invention, there is provided a pattern discrimination apparatus for discriminating an object in data using features selected by the above-described feature selection apparatus, and a discriminator, the apparatus comprising: a discrimination unit configured to obtain discrimination values by applying the discriminator to a plurality of partial data obtained from the data; and a classifying unit configured to classify the data to a predetermined class by comparing the obtained discrimination values and the features.

Further features of the present invention will become apparent from the following description of exemplary embodiments with reference to the attached drawings.

BRIEF DESCRIPTION OF THE DRAWINGS

FIG. 3 is a block diagram showing the processing arrangement of discrimination processing according to an embodiment;

DESCRIPTION OF THE EMBODIMENTS

Some preferred embodiments of the present invention will be described hereinafter with reference to the accompanying drawings.

Prior to descriptions of respective embodiments, the arrangement of an information processing apparatus which can execute discrimination processing and feature selection processing of the respective embodiments will be described.

Figure 12:
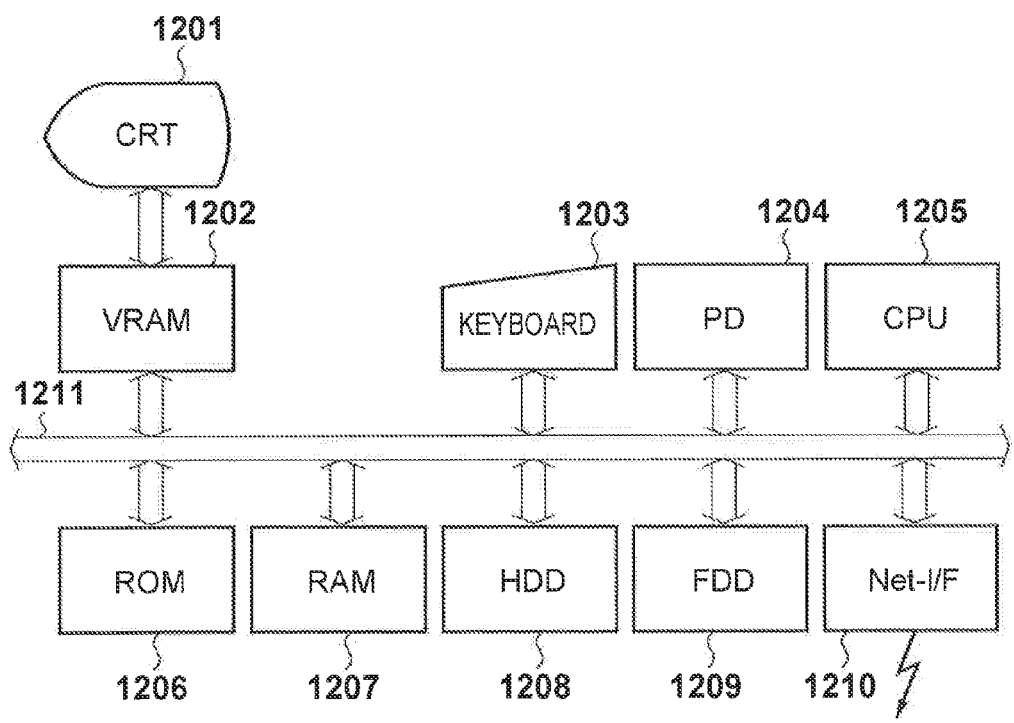
FIG. 12 is a block diagram showing an example of the arrangement of an information processing apparatus which can execute the processes of the respective embodiments.

FIG. 12 is a block diagram showing an example of the arrangement of an information processing apparatus. Reference numeral 1201 denotes a CRT which displays information of data which are being processed by an application program, various message menus, and the like. Reference numeral 1202 denotes a video RAM (to be referred to as a VRAM hereinafter) on which images to be displayed on the screen of the CRT 1201 are to be expanded. Reference numerals 1203 and 1204 respectively denote a keyboard and pointing device, which are used to input characters in a predetermined field on the screen, and to point to icons and buttons on a GUI. Reference numeral 1205 denotes a CPU which controls the overall apparatus.

Reference numeral 1206 denotes a ROM which stores operation processing sequences (programs) of the CPU 1205. Note that this ROM 1206 also stores programs associated with flowcharts to be described later in addition to an application program associated with data processing and an error processing program. Reference numeral 1207 denotes a RAM used as a work area when the CPU 1205 executes the aforementioned various programs and a temporary saving area at the time of error processing.

Reference numeral 1208 denotes a hard disk drive (to be abbreviated as an HDD hereinafter); and 1209, a Floppy® disk drive (to be abbreviated as an FDD hereinafter). The respective disks are used to save and load application programs, data, libraries, and the like. In place of or in addition to the FDD, an optical (magnetooptical) disk drive such as a CD-ROM, MO, or DVD, or a magnetic tape drive such as a tape streamer or DDS may be arranged. Reference numeral 1210 denotes a network interface used to connect the apparatus to a network. Reference numeral 1211 denotes an I/O bus (including an address bus, data bus, and control bus) used to connect the aforementioned units.

First Embodiment

As the first embodiment, an example of a partial feature selection method used in a discriminator required to discriminate a position and orientation of a specific object (to be referred to as an object A hereinafter) in each image by inputting, as data to be discriminated, a grayscale image of 1000×1000 pixels, which image is obtained by capturing the object A will be described below. In order to explain this feature selection method, the operation of the discriminator will be described first using FIG. 3 which shows the block diagram of the processing arrangement of discrimination processing and FIG. 4 which shows the processing sequence of the discrimination processing. Note that the discrimination processing and feature selection processing to be described in the following embodiments are implemented when the aforementioned information processing apparatus (for example, a computer) executes predetermined programs stored in a memory. As will be understood by those who are skilled in the art, some or all of processes to be described hereinafter can be implemented by dedicated hardware components.

In step S40, an image input unit 30 inputs, as data to be discriminated, a grayscale image of 1000×1000 pixels (to be referred to as an input image hereinafter) to be used as an object to be discriminated. The subsequent processes are applied to the input image to discriminate a position and orientation of the object A in the input image.

In step S41, a pre-processing unit 31 applies pre-processing such as edge extraction to the input image input by the image input unit 30 to generate a pre-processed image as a result of the pre-processing. In the pre-processing in this discrimination processing, smoothing processing using a Gaussian filter for the purpose of noise suppression, and edge strength extraction processing using a Sobel filter are executed. Then, an edge strength map of respective pixel positions obtained by the edge strength extraction processing is output as the pre-processed image, and the subsequent discrimination processing is applied to this pre-processed image.

In step S42, a discriminator setting unit 33 selects one discriminator in turn from a plurality of discriminators, which are recorded in advance in a discriminator information database 32 configured by a memory, and executes processing for loading information associated with discrimination rules of the selected discriminator. This discrimination processing uses, as a discriminator, a Fern discriminator described in "Mustafa Ozuysal, Michael Calonder, Vincent Lepetit and Pascal Fua, "Fast Keypoint Recognition using Random Ferns", IEEE Transactions on Pattern Analysis and Machine Intelligence, Vol. 32, No. 3, pp. 448-461, March 2010" (to be referred to as non-patent literature 3 hereinafter). The Fern discriminator is that in which a plurality of element discriminators are arranged in series. The Fern discriminator generally uses relatively simple, binary element discriminators. That is, it is a common practice to use an element discriminator which discriminates data based on an arbitrary simple discrimination rule, and outputs a result {0, 1}. As the element discriminator used in this discrimination processing, a relatively simple, binary element discriminator is also used. This discriminator compares values of two points (to be referred to as reference points 1 and 2 hereinafter) having different relative positions from a reference position, and outputs a result {0, 1} by discriminating their magnitude relationship. The number of element discriminators included in the Fern discriminator may be arbitrary. This embodiment uses a Fern discriminator including 16 element discriminators. In this discrimination processing, 50 Fern discriminators are used, and are recorded in advance in the discriminator information database 32. Note that the number of Fern discriminators to be used is 50 in this discrimination processing, but it may be arbitrary. Using more Fern discriminators, a possibility of attaining higher discrimination performance increases.

The discriminator setting unit 33 selects one Fern discriminator in turn from the 50 Fern discriminators, and loads pieces of information of 16 element discriminators included in that Fern discriminator, that is, pieces of information of their discrimination rules. More specifically, the discriminator setting unit 33 loads relative positions from a processing reference position (to be described later) of reference points 1 and 2, values of which are to be compared, for each of the 16 element discriminators. Note that the plurality of element discriminators included in the discriminator may use an identical discrimination rule or those of different discrimination rules may be combined. For example, each discriminator may include the aforementioned element discriminators and linear binary discriminators used in the fourth embodiment.

Subsequently, in step S43, a processing reference position setting unit 39 sequentially selects one position from the pre-processed image generated by the pre-processing unit 31 as a reference position in processing of a subsequent discrimination processing unit 35, and sets the selected position as a processing reference position. The processing reference position set in this step is that in the discrimination processing using the Fern discriminator in the subsequent discrimination processing unit 35, as will be described in detail later. Note that the selection order of this processing reference position can be arbitrary. For example, the processing reference position may be selected pixel by pixel in turn from an upper left pixel to a lower left pixel on the image in a raster-scan order.

In step S44, the discrimination processing unit 35 applies discrimination processing at the processing reference position set by the processing reference position setting unit 34 to the pre-processed image generated by the pre-processing unit 31 using the Fern discriminator selected by the discriminator setting unit 33. More specifically, the discrimination processing unit 35 executes processing for applying discrimination processes of the respective element discriminators included in the Fern discriminator at the processing reference position of the pre-processed image, and calculating a discrimination result sequence by arranging their discrimination results (discrimination values) in turn. Each element discriminator compares values of the pre-processed image at positions of the two reference points 1 and 2 having different relative positions from the processing reference position, and outputs a discrimination value {0, 1} based on their magnitude relationship, as described above. That is, when a value of the pre-processed image at the position of the reference point 1 is larger than that of the pre-processed image at the position of the reference point 2, the element discriminator outputs 1; otherwise, it outputs 0.

The discrimination processing by the element discriminators in this discrimination processing will be described in detail below. For example, assume that the processing reference position setting unit 34 sets the processing reference position at a position (x, y) of the pre-processed image. Then, the discrimination rule information of an element discriminator, that is, relative position coordinates from the processing reference position of the two reference points 1 and 2 are respectively $(x_1, y_1)$ and $(x_2, y_2)$. At this time, a value $v_1$ corresponding to the reference point 1 is that at a position $(x+x_1, y+y_1)$ of the pre-processed image, and a value $v_2$ corresponding to the reference point 2 is that at a position $(x+x_2, y+y_2)$ of the pre-processed image. Then, the discrimination processing using this element discriminator executes processing for loading the values $v_1$ and $v_2$ with reference to the respective positions on the pre-processed image, comparing these values, and outputting 1 if $v_1 > v_2$; 0 if $v_1 = v_2$.

Since this discrimination processing uses the Fern discriminator including 16 element discriminators, as described above, the discrimination processing using the element discriminator is executed for one processing reference position respectively by the 16 element discriminators. Then, a discrimination result sequence is calculated by arranging 16 output discrimination values {0, 1} of the respective element discriminators in a predetermined order. For this reason, one of $2^{16}$=65536 different discrimination result sequences ranging from 0000000000000000 to 1111111111111111 in binary notation is obtained. The discrimination processing unit 35 executes processing for calculating a discrimination result sequence indicating one of 65536 different sequences at the processing reference position set by the processing reference position setting unit 34, as described above.

In step S45, a discrimination result recording unit 36 refers to the number of hypotheses and pieces of position/orientation hypothesis information as many as the number of hypotheses, which are recorded in the discriminator information database 32, based on the discrimination result sequence calculated by the discrimination processing unit 35, and cumulatively records those pieces of information. This position/orientation hypothesis information is a hypothesis associated with a position and orientation at which the object A exists (to be simply referred to hypothesis information hereinafter). Of the hypothesis information, information associated with a position is that of a relative position to the processing reference position set by the processing reference position setting unit 34. More specifically, the hypothesis information is that including orientation information $\theta$ and relative position information $(x_r, y_r)$ as one set. For example, if the processing reference position is $(x, y)$, the hypothesis is interpreted that the central position of the object A having the orientation $\theta$ exists at a position $(x+x_r, y+y_r)$. The discriminator information database 32 records the number of hypotheses corresponding to each discrimination result sequence and pieces of hypothesis information corresponding to that discrimination result sequence as many as the number of hypotheses for each of a plurality of discriminators. The number of hypotheses corresponding to one discrimination result sequence may correspond to only one set of hypothesis information, a plurality of sets of hypothesis information, or no hypothesis information.

In the practical processing of this discrimination result recording unit 36, the number of hypotheses, which is recorded in the discriminator information database 32, and corresponds to the discrimination result sequence calculated by the discrimination processing unit 35 using the discriminator selected by the discriminator setting unit 33, is referred to. For example, assuming that the discriminator setting unit 33 selects a C-th discriminator, and a discrimination result sequence calculated by the discrimination processing unit 35 is R, the number of hypotheses, which is recorded in the discriminator information database 32 and corresponds to the discrimination result sequence R of the C-th discriminator, is referred to. In this case, when the corresponding number of hypotheses is zero, the processing in this discrimination result recording unit 36 ends without recording any hypothesis information. When the corresponding number of hypotheses indicates one or more hypotheses, processing for respectively referring to pieces of hypothesis information as many as the number of hypotheses, and cumulatively recording these pieces of information is executed. More specifically, as described above, when the current processing reference position is $(x, y)$ and one set of hypothesis information includes an orientation $\theta$ and relative position $(x_r, y_r)$, a score of a hypothesis indicating that the object A having the orientation $\theta$ exists at a position $(x+x_r, y+y_r)$ is incremented. A value corresponding to an increment of the score may be a predetermined constant, but a value inversely proportional to the corresponding number of hypotheses is preferably used. For example, if the number of hypotheses is N, the score is incremented by 1/N. By executing this processing for the pieces of hypothesis information as many as the corresponding number of hypotheses, the processing in this discrimination result recording unit 36 ends.

The aforementioned processes in the discrimination processing unit 35 and discrimination result recording unit 36 are repetitively executed until all positions on the pre-processed image are processed as a processing reference position. That is, upon completion of the processing in the discrimination result recording unit 36, it is checked whether or not positions on the pre-processed image, which positions are to be selected by the processing reference position setting unit 34, still remain (step S46). If positions on the pre-processed image, which positions are to be selected by the processing reference position setting unit 34, still remain (NO in step S46), the control returns to the processing (step S43) by the processing reference position setting unit 34 to repetitively execute the processes in the discrimination processing unit 35 and discrimination result recording unit 36. With this loop processing, the processes in the discrimination processing unit 35 and discrimination result recording unit 36 are executed using one discriminator selected by the discriminator setting unit 33 for all the positions on the pre-processed image. For this reason, since pieces of hypothesis information as many as the numbers of hypotheses corresponding to obtained discrimination result sequences are recorded per processing reference position, a large number of pieces of hypothesis information (on the order of [the average number of hypotheses]×[the number of processing reference positions] are cumulatively recorded. In the example of this discrimination processing, since all positions in the image are set as the processing reference positions, the number of processing reference positions=1000×1000=one million, and a large number of pieces of hypothesis information as many as [the average number of hypotheses]×one million are cumulatively recorded.

Furthermore, the aforementioned loop processing is repetitively executed in turn in association with all discriminators recorded in the discriminator information database 32. That is, after completion of the loop processing for one discriminator, it is checked whether or not discriminators to be selected by the discriminator setting unit 33 still remain (step S47). If discriminators to be selected by the discriminator setting unit 33 still remain (NO in step S47), the control returns to the processing (step S42) in the discriminator setting unit 33 to select a new discriminator, thus repetitively executing the loop processing for one discriminator. Then, the loop processing for one discriminator is executed for all the discriminators recorded in the discriminator information database 32. As a result, a huge number of pieces of hypothesis information as many as [the average number of hypotheses]×[the number of processing reference positions (one million in the above example)]×[the number of discriminators (50 in the above example)] are cumulatively recorded as a whole.

Finally, in step S48, a discrimination result output unit 37 discriminates a position and orientation at which the object A exists in the input image input by the image input unit 30 based on a large number of pieces of hypothesis information cumulatively recorded by the aforementioned processing, and outputs a result. More specifically, the discrimination result output unit 37 detects hypothesis information with a maximum score from a large number of pieces of cumulatively recorded hypothesis information, and discriminates that object A exists to have the position and orientation in that hypothesis information. That is, when a score of hypothesis information indicating that, for example, the object A having an orientation $\theta_{max}$ exists at a position $(x_{max}, y_{max})$ is maximum, it is discriminated that the object A exists to have this position and orientation.

With the aforementioned processing, a position and orientation at which a specific object exists in the input image input by the image input unit 30 can be discriminated. Note that since the aforementioned processing outputs only a result corresponding to hypothesis information with the maximum score, only one discrimination result is obtained even when the input image includes a plurality of specific objects. However, not only the hypothesis information with the maximum score, but also a plurality of pieces of hypothesis information whose scores exceed a predetermined threshold, are selected, and they are output as discrimination results, thus easily coping with the input image including the plurality of specific objects. With the above processing, by comparing discrimination values obtained by applying discriminators to an input image with pieces of hypothesis information (features), that image can be classified into a predetermined class.

As one factor that decides the discrimination performance of the discrimination processing, what kinds of features and hypothesis information are to be associated with discrimination result sequences of respective discriminators is known. A method of selecting what kinds of features and hypothesis information are to be used will be described below.

Figure 1:
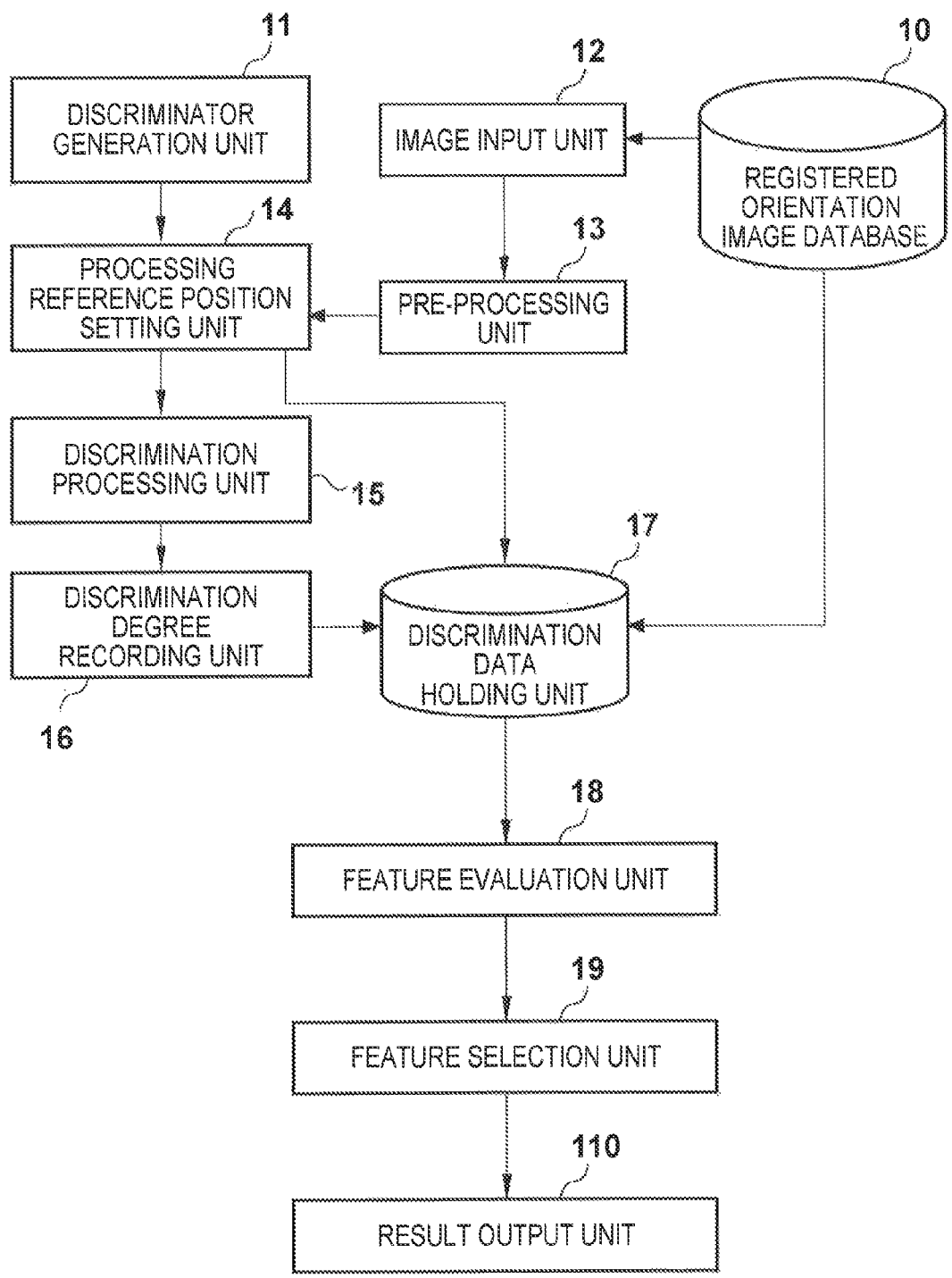
FIG. 1 is a block diagram showing the processing arrangement of a feature selection method according to the first and third embodiments.
Figure 2:
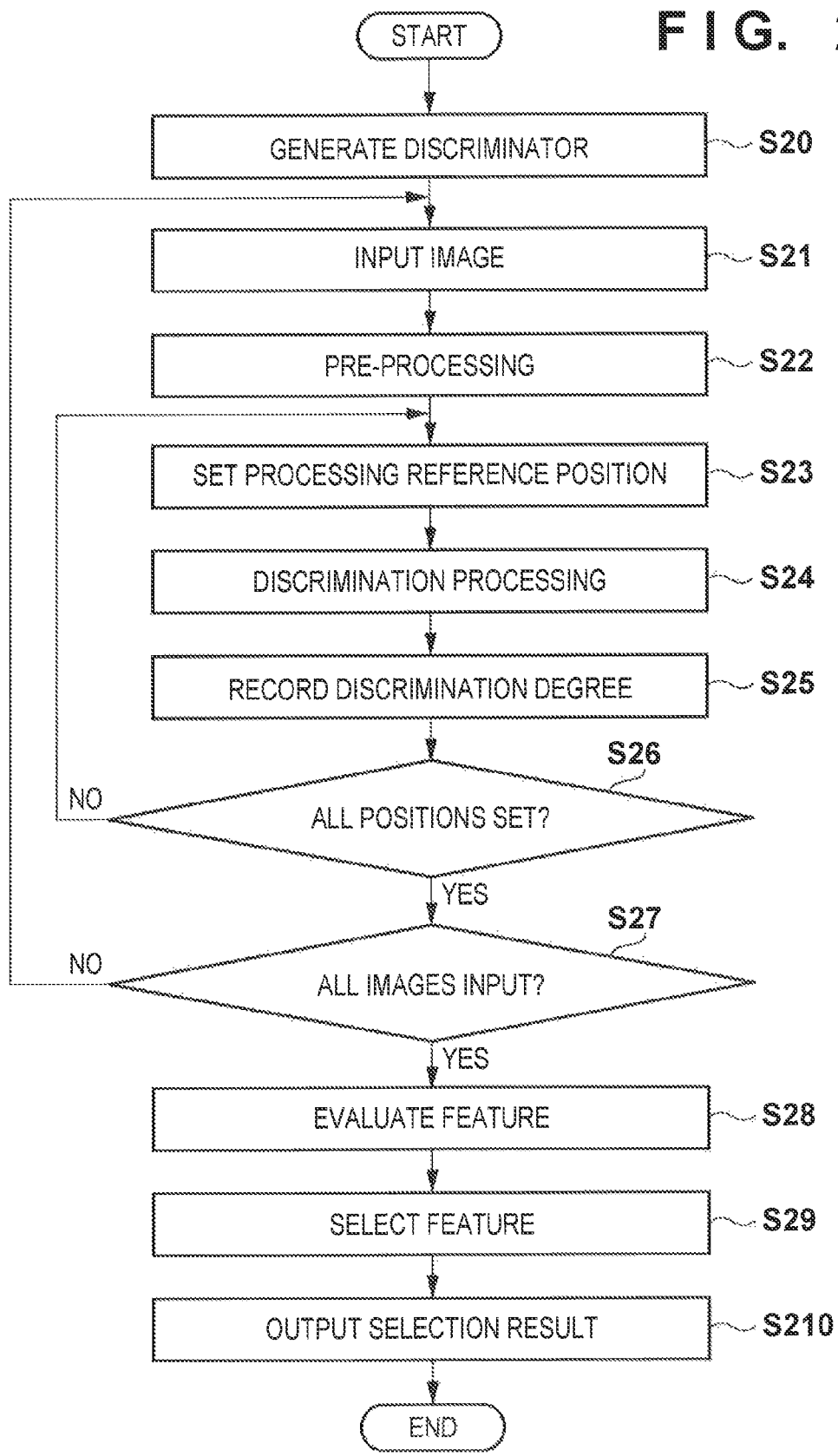
FIG. 2 is a flowchart showing processing of the feature selection method according to the first and third embodiments.

FIG. 1 is a block diagram required to implement the feature selection method according to the first embodiment, that is, a method of selecting hypothesis information to be associated with a discrimination result sequence of each discriminator. FIG. 2 is a flowchart showing the processing sequence of the feature selection method according to the first embodiment. The feature selection method according to the first embodiment will be described below with reference to FIGS. 1 and 2.

Figure 5:
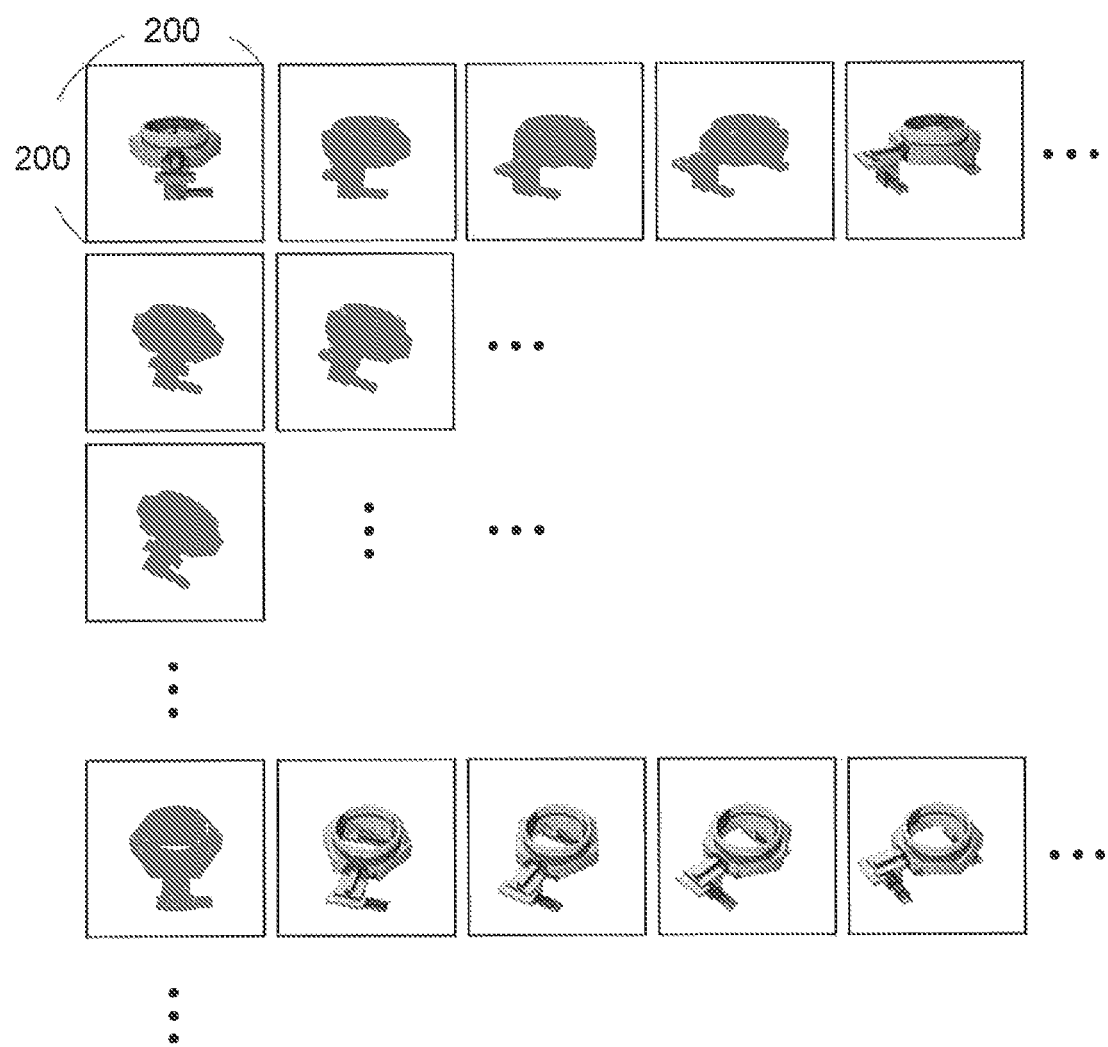
FIG. 5 shows registered orientation images according to the embodiment.

A registered orientation image database 10 records images obtained by capturing images of a specific object to be discriminated (object A) from various directions as learning data. Images registered in the registered orientation image database 10 are a plurality of grayscale images shown in, for example, FIG. 5. In this embodiment, each image is an image of 200×200 pixels, which is aligned so that the central position of the object A matches the center of the image. The registered orientation image database 10 also records relative orientation information indicating an orientation of the object A, which is captured in each image, with respect to an image capturing unit. In this embodiment, 1000 sets of images of the object A, which are captured from various directions, and corresponding pieces of relative orientation information are recorded in the registered orientation image database 10. In the following description, letting $P_1$, $P_2, \ldots, P_{1000}$ be 1000 images, respectively, and $\theta_1$, $\theta_2, \ldots, \theta_{1000}$ be corresponding in this embodiment, 1000 pieces of relative orientation information do not include those which are regarded as identical information. That is, assume that the 1000 images are those obtained by capturing the object A to have all different relative orientations.

In step S20, a discriminator generation unit 11 generates a Fern discriminator by setting a discrimination rule (position coordinates of the reference points 1 and 2) in a discriminator. Since this embodiment uses a Fern discriminator including 16 element discriminators, as described above, 16 element discriminators described above are generated, and a Fern discriminator is generated by coupling these discriminators. Each element discriminator is generated by randomly selecting positions of the reference points 1 and 2 within a range of 21×21 pixels, that is, a range from −10 to +10 in the horizontal direction, and that from −10 to +10 also in the vertical direction.

In this manner, the discriminator of this embodiment executes discrimination using only very limited data, that is, [the number of element discriminators]×[the number of data to be referred to by element discriminator], compared to an original image of 200×200 pixels. That is, this discriminator executes discrimination based on only very limited features in all original features (200×200=40000 in this embodiment). Note that the positions of the two reference points set for each element discriminator can be randomly selected within the range of 21×21 pixels (partial data), but it is preferable not to select the same position as those of the two reference points. This is because in this embodiment, since comparison between values at the same position results in an equal sign, that element discriminator always outputs zero, and becomes an insignificant one. Also, when one Fern discriminator includes a plurality of element discriminators including the same combination of two reference point positions, these discriminators output the same result. More strictly, when the reference point positions are replaced, an output result changes only when the two point values match, but the same result is output when the two point values do not match. For this reason, these element discriminators become insignificant ones except for one element discriminator. Hence, a plurality of element discriminators (16 element discriminators in this embodiment) included in one Fern discriminator preferably include different combinations of two reference points.

Note that in this embodiment, an element discriminator is generated by randomly selecting two reference points. However, the discriminator generation method in the feature selection method of the present invention is not limited to this. It is important to generate various variations of element discriminators. For this purpose, like in bagging described in, for example, "L. Breiman, "Bagging Predictors", Machine Learning 26, pp. 123-140, 1996" (to be referred to as non-patent literature 4 hereinafter), appropriate data may be sampled from image data recorded in the registered orientation image database 10, and a discriminator may be generated by learning using the sampled data.

In step S21, an image input unit 12 inputs image data recorded in the registered orientation image database 10 one by one. Image data may be input in an arbitrary order. However, in this embodiment, image data are input one by one in turn from the image $P_1$ until the image $P_{1000}$.

Figure 4:
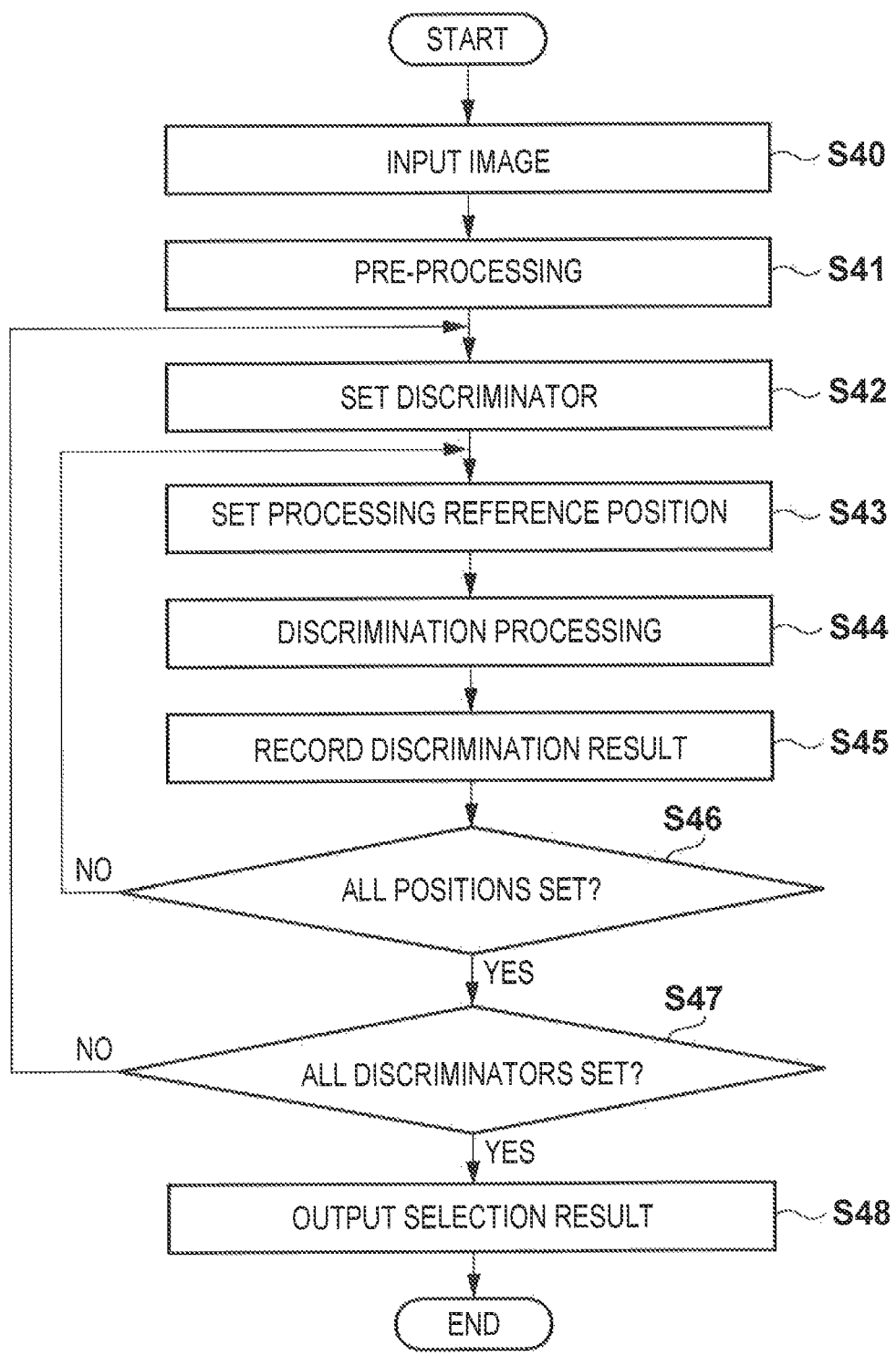
FIG. 4 is a flowchart showing the discrimination processing according to the embodiment.

In step S22, a pre-processing unit 13 applies pre-processing such as smoothing to the image input by the image input unit 12 in the same manner as the processing in step S41 in FIG. 4 in the aforementioned discrimination processing, thereby generating a pre-processed image. In step S23, a processing reference position setting unit 14 executes the same processing as that in step S43 in FIG. 4 in the aforementioned discrimination processing. That is, the processing reference position setting unit 14 executes processing for selecting one processing reference position in the processing of a subsequent discrimination processing unit 15 each in turn from the pre-processed image generated by the pre-processing unit 13, and setting the selected position as a processing reference position.

In step S24, the discrimination processing unit 15 executes the same processing as that in step S44 in FIG. 4 in the aforementioned discrimination processing, and calculates element discrimination degrees in the discrimination processing of the respective element discriminators. The element discrimination degree is something like a likelihood of an output (an output {0, 1} in this embodiment) of an element discriminator. In this embodiment, as this element discrimination degree, a difference absolute value between two point values to be compared by the element discriminator is used. That is, the discrimination processing unit 15 executes processing for obtaining outputs from the respective element discriminators to calculate a discrimination result sequence by arranging these outputs in turn, and also calculating the element discrimination degree of each element discriminator, that is, the difference absolute value between the two point values compared by that element discriminator. With this processing, one discrimination result sequence, and the values of the element discrimination degrees as many as the number of element discriminators are obtained in association with one processing reference position selected by the processing reference position setting unit 14.

Figure 6:
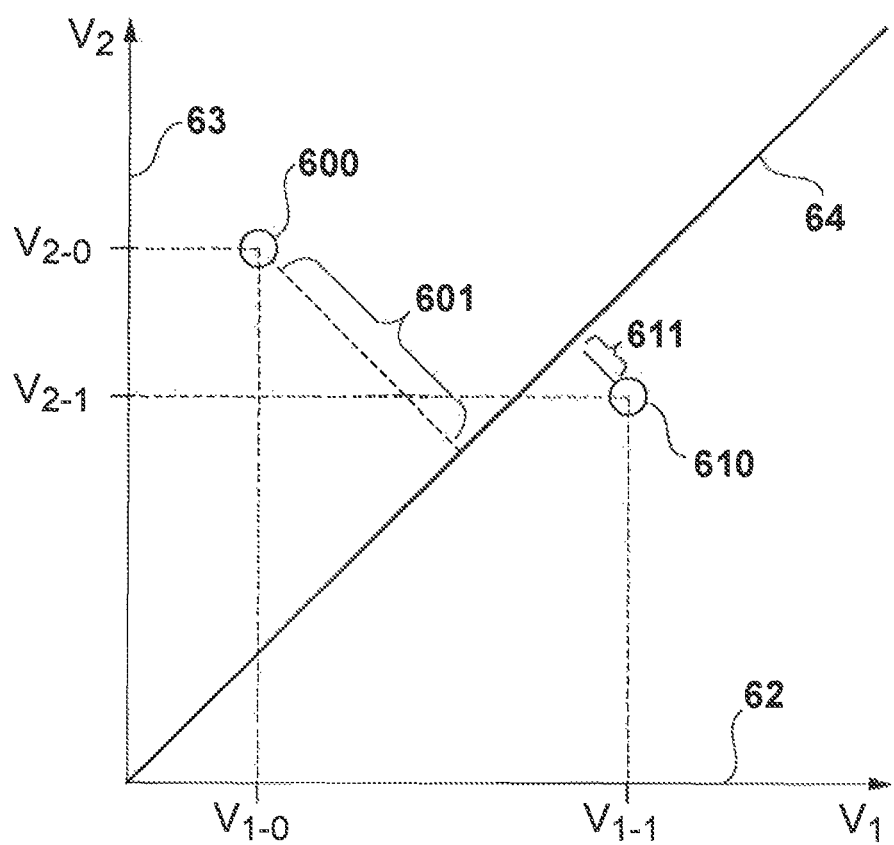
FIG. 6 is a graph for explaining element discrimination degrees according to the embodiment.

This element discrimination degree calculated by the discrimination processing unit 15 will be described below with reference to FIG. 6. In FIG. 6, a $v_1$ axis 62 plots a value at a position of the reference point 1 of a certain element discriminator, and a $v_2$ axis 63 plots a value at a position of the reference point 2. In processing of the element discriminator at a certain processing reference position, when the position of the reference point 1 assumes a value $v_{1\text{-}0}$ and that of the reference point 2 assumes a value $v_{2\text{-}0}$, corresponding data is plotted at a point 600 in FIG. 6. Likewise, when the position of the reference point 1 assumes a value $v_{1\text{-}1}$ and that of the reference point 2 assumes a value $v_{2\text{-}1}$, corresponding data is plotted at a point 610. Since the element discriminator of this embodiment outputs 1 when $v_1 > v_2$, 1 is output for data plotted on a lower right region (that including the point 610) to have a boundary line 64 in FIG. 6. Also, 0 is output for data plotted on an upper left region (that including the point 600) of the boundary line 64, which region includes positions on the boundary line 64. That is, this element discriminator outputs 1 for data corresponding to the point 610, and outputs 0 for data corresponding to the point 600.

A case will be examined below wherein a value at a reference point position of each data varies due to an arbitrary factor. In this case, a position to be plotted of each point in FIG. 6 varies according to that variation. In some cases, the value may vary beyond the boundary line 64, and the output of the element discriminator may change. Assuming that a degree of variation cause for each data remains the same, the point 610 is more likely to cause a change in output of the element discriminator compared to the point 600 in FIG. 6. That is, the point 600 is harder to cause a change in output of the element discriminator, and has a higher likelihood with respect to the output. Assuming that a degree of variation cause for each data remains the same, the magnitude of such likelihood corresponds to a distance from a plotted point of each data to the boundary line 64. For example, a distance 601 from the point 600 to the boundary line 64 is larger than a distance 611 from the point 610 to the boundary line 64. For this reason, it is estimated that the output of the element discriminator for data corresponding to the point 600 has a higher likelihood than the output of the element discriminator for data corresponding to the point 610. The distance from each plotted point to the boundary line 64 is proportional to a difference absolute value of values at respective reference point positions. Hence, in this embodiment, this difference absolute value is used in place of the distance to the boundary line 64, and this value is used as a likelihood of discrimination of that element discriminator, that is, an element discrimination degree for that data.

In step S25, a discrimination degree recording unit 16 calculates a discrimination degree by combining element discrimination degrees of the respective element discriminators obtained by the discrimination processing unit 15, and records the calculated degree in a discrimination data holding unit 17 together with the corresponding discrimination result sequence. This discrimination degree represents a likelihood of the overall Fern discriminator including the plurality of element discriminators. In this embodiment, a sum total of the element discrimination degrees is simply used as a discrimination degree.

The discrimination degree to be calculated, that is, the sum total of the element discrimination degrees can be interpreted as a Manhattan distance between mapped points of data that have undergone the discrimination processing in the discrimination processing unit 15 on a discrimination space defined by the Fern discriminator generated by the discriminator generation unit 11, and an origin of the discrimination space. This interpretation of the discrimination degree will be described below with reference to FIG. 11. The discrimination space in the feature selection method of this embodiment expresses intermediate processing results in the discrimination processing. In the discrimination processing, a discrimination result is decided using these intermediate processing results. For example, a nearest neighbor discriminator, as one of simplest discriminators, decides a discrimination result in correspondence with a prototype with the shortest distance of distances from a plurality of prototypes. For this reason, in the nearest neighbor discriminator, distances from respective prototypes are intermediate processing results, and a discrimination space is specified by values of the distances from the respective prototypes. In the Fern discriminator used in this embodiment, one element discriminator compares values of two points, as described above. This is equivalent to decision of a result of the element discriminator based on a difference value between the two point values. For this reason, an axis corresponding to a difference value $(v_1-v_2)$ between the two point values can be considered as one axis of the discrimination space. Since the Fern discriminator of this embodiment includes 16 element discriminators, the discrimination space can be defined as a 16-dimensional space specified by axes each corresponding to the difference value between the two point values to be referred to by each element discriminator.

Figure 11:
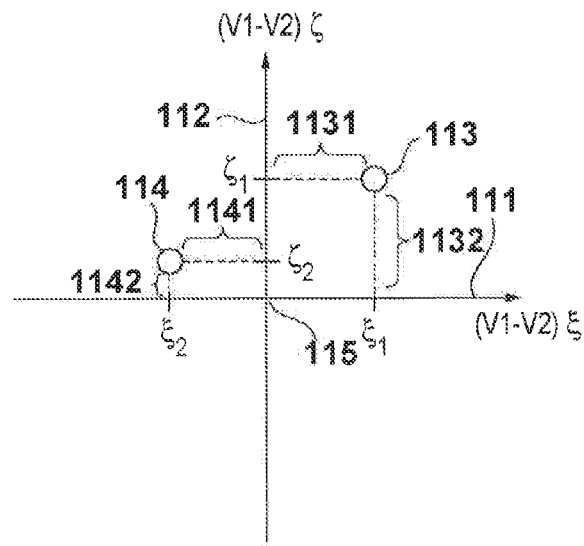
FIG. 11 is a graph showing a discrimination space according to the first embodiment.

FIG. 11 is a graph showing this discrimination space. An axis 111 expresses a difference value $(v_1-v_2)_\xi$ between two point values to be referred to by one element discriminator $\xi$. Another axis 112 expresses a difference value $(v_1-v_2)_\zeta$ between two point values to be referred to by another element discriminator $\zeta$. Data which has undergone the discrimination processing in the discrimination processing unit 15 is mapped at one point on the discrimination space according to respective difference values. For example, as shown in FIG. 11, data corresponding to a difference value $\xi_1$ between the two point values to be referred to by the element discriminator $\xi$ and a difference value $\zeta_1$ between the two point values to be referred to by the element discriminator $\zeta$ is mapped at a position of a point 113. Likewise, data corresponding to difference values $\xi_2$ and $\zeta_2$ is mapped at a position of a point 114. In this connection, as for the data corresponding to the point 113, since $\xi_1 > 0$ and $\zeta_1 > 0$, both the element discriminators $\xi$ and $\zeta$ output 1. At the point 114, since $\xi_2 \leq 0$ and $\zeta_2 > 0$, the element discriminator $\xi$ outputs 0, and the element discriminator $\zeta$ outputs 1. A distance 1131 between the point 113 and axis 112 corresponds to an element discrimination degree ($=\xi_1$) of the element discriminator $\xi$ in the data corresponding to the point 113, and a distance 1132 between the point 113 and axis 111 corresponds to an element discrimination degree ($=\zeta_1$) of the element discriminator $\zeta$. Likewise, distances 1141 and 1142 respectively correspond to element discrimination degrees ($=\xi_2$ and $\zeta_2$) of the element discriminators $\xi$ and $\zeta$ in the data corresponding to the point 114. The outputs of the respective element discriminators change to have the respective axes in FIG. 11 as boundaries, and each region having the axis as a boundary corresponds to a combination of outputs of the respective element discriminators, that is, one discrimination result sequence.

Since an origin 115 of the discrimination space shown in FIG. 11 is located on the boundaries of all regions, regions adjacent to the origin 115 are those in which discrimination result sequences are most unstable. Hence, using a distance from this origin 115, a likelihood for a discrimination result sequence is evaluated. The discrimination degree of this embodiment is the sum total of respective element discrimination degrees, and corresponds to the Manhattan distance between the origin of the discrimination space and points mapped on this discrimination space. That is, in this embodiment, the Manhattan distance to the origin of the discrimination space=the sum total of element discrimination degrees=the discrimination degree.

Note that the discrimination degree calculation method may use other methods as long as they represent a likelihood of a discrimination result sequence output from each Fern discriminator. For example, a method of setting a minimum value of respective element discrimination degrees as this discrimination degree may be used. In this case, in the interpretation on the discrimination space shown in FIG. 11, this method is equivalent to a calculation of a distance between the mapped point and a closest boundary where a discrimination result sequence unwantedly changes. The discrimination degree recording unit 16 records such discrimination degree and the discrimination result sequence obtained by the discrimination processing unit 15 in the discrimination data holding unit 17. In this case, the unit 16 also records information of data itself from which these results (the discrimination degree and discrimination result sequence) are obtained in association with the results. The information of the data itself includes relative orientation information and the processing reference position corresponding to image data which has undergone the discrimination processing in the discrimination processing unit 15. For example, as results obtained when the discrimination processing unit 15 executes the discrimination processing to have a position $(x_m, y_m)$ of an image $P_n$ as a processing reference position, corresponding relative orientation information $\theta_n$ and the position $(x_m, y_m)$ are recorded in the discrimination data holding unit 17 together with the calculated discrimination result sequence and discrimination degree. With the processing of this discrimination degree recording unit 16, data (discrimination data) including the discrimination result sequence, discrimination degree, relative orientation information, and processing reference position as one set is recorded in the discrimination data holding unit 17.

The aforementioned processes in the discrimination processing unit 15 and discrimination degree recording unit 16 are repetitively executed when all positions on the pre-processed image generated by the pre-processing unit 13 are processed as a processing reference position. That is, after completion of the processing in the discrimination degree recording unit 16, when positions on the pre-processed image, which positions are to be selected by the processing reference position setting unit 14, still remain, the control returns to the processing in the processing reference position setting unit 14, thus repetitively executing the processes in the discrimination processing unit 15 and discrimination degree recording unit 16. The repetitive processing in this case corresponds to loop processing in step S26 in FIG. 2. With this loop processing, the processes in the discrimination processing unit 15 and discrimination degree recording unit 16 using the discriminator generated by the discriminator generation unit 11 are executed at all positions on the pre-processed image. That is, a plurality of partial data extracted from learning data are processed by a discriminator generated in step S20 to obtain discrimination values, which are respectively used as features of the plurality of partial data. For this reason, since one set of discrimination data is recorded for one processing reference position (partial data), discrimination data as many as the total number of pixels (in this embodiment, 200×200=40000) are recorded in the discrimination data holding unit 17. In this manner, in the feature selection method of this embodiment, a discrimination degree at each position is calculated using a discriminator generated by the discriminator generation unit 11 while changing a processing reference position pixel by pixel. As described above, since the discriminator used in the feature selection method of this embodiment executes discrimination based on only limited features, respective discrimination degrees are calculated by executing processing using different feature sets in original data by changing a processing reference position.

Furthermore, the aforementioned loop processing is repetitively applied in turn to all images recorded in the registered orientation image database 10. After completion of the loop processing for one image, when images to be input by the image input unit 12 still remain, the control returns to the processing in the image input unit 12 to input a new image. Then, after the pre-processing unit 13 generates a pre-processed image corresponding to the new input image, the loop processing for that image is repetitively executed again. The further repetitive processing corresponds to loop processing in step S27 in FIG. 2. In this manner, the loop processing for one image is executed for all the images recorded in the registered orientation image database 10. For this reason, in this embodiment, since the registered orientation image database 10 records 1000 images, a large number of discrimination data as many as 1000×[the total number of pixels of one image] are recorded in the discrimination data holding unit 17 as a whole. In this embodiment, since the total number of pixels of one image is 40000, 40000000 (=1000×40000) discrimination data are recorded in the discrimination data holding unit 17.

In step S28, a feature evaluation unit 18 calculates a usefulness degree as a feature of each of a large number of discrimination data recorded in the discrimination data holding unit 17. More specifically, a usefulness degree as a feature of each discrimination data is calculated by dividing a discrimination degree, which is included in the discrimination data and is calculated by the discrimination degree recording unit 16, by the number of discrimination data corresponding to a corresponding discrimination result sequence. For example, letting L(r) be the number of discrimination data, which are recorded in the discrimination data holding unit 17, and correspond to a discrimination result sequence r, and letting R be a discrimination result sequence of certain discrimination data and a be a discrimination degree included in that data, a usefulness degree as a feature for this discrimination data is given by $\alpha/L(R)$. As the usefulness degree as a feature, which degree is to be calculated in this step, the discrimination degree itself may be simply used intact. However, as described above, in consideration of the number of discrimination data corresponding to an identical discrimination result sequence, uniqueness of each discrimination data can also be evaluated. More specifically, a large number of discrimination data corresponding to an identical discrimination result sequence exist, that is, non-unique discrimination data are evaluated to have relatively low usefulness degrees as features, which degrees are to be calculated in this step. Conversely, a small number of discrimination data corresponding to an identical discrimination result sequence, that is, unique discrimination data are evaluated to have relatively high usefulness degrees as features, which degrees are to be calculated in this step. That is, a usefulness degree as a feature, which degree is to be calculated in this step, is evaluated to be high when that discrimination result sequence has a high degree of purity (the number of discrimination data corresponding to an identical discrimination result sequence is small), and is evaluated to be low when that discrimination result sequence has a low degree of purity (the number of discrimination data corresponding to an identical discrimination result sequence is large). In other words, the usefulness degree of a discrimination result sequence having high specificity is evaluated to be high; that of a discrimination result sequence having low specificity is evaluated to be low. With the processing in this step, usefulness degrees as features are calculated for all discrimination data recorded in the discrimination data holding unit 17 according to their discrimination degrees and uniqueness.

In step S29, a feature selection unit 19 selects discrimination data to be used as hypothesis information to be associated with each individual discrimination result sequence based on the usefulness degrees as features of the respective discrimination data calculated by the feature evaluation unit 18. In this embodiment, the feature selection unit 19 selects top 50 discrimination data having high usefulness degrees as features, which are calculated by the feature evaluation unit 18, for each of all image data recorded in the registered orientation image database 10. In this embodiment, since 1000 images are recorded in the registered orientation image database 10, 50 discrimination data are selected for each image, that is, 50000 (=1000×50) discrimination data are selected for all the images by the processing in this step. The discrimination data selected in this step correspond to results obtained by applying processing to different feature sets as described above. For this reason, selection of discrimination data by this feature selection unit 19 can be interpreted as that of results to be used, which correspond to feature sets in original data.

Finally, in step S210, a result output unit 110 calculates pieces of hypothesis information corresponding to respective discrimination result sequences of Fern discriminators generated by the discriminator generation unit 11 based on the discrimination data selected by the feature selection unit 19. Then, the result output unit 110 outputs these pieces of hypothesis information and pieces of information of the Fern discriminators generated by the discriminator generation unit 11 as sets to the discriminator information database 32.

More specifically, hypothesis information based on discrimination data selected by the feature selection unit 19 is calculated as follows. For example, assume that one selected discrimination data includes a discrimination result sequence $R_s$, relative orientation information $\theta_s$, and processing reference position $(x_s, y_s)$. At this time, hypothesis information corresponding to this discrimination data includes orientation information $\theta_s$ and relative position information $(100-x_s, 100-y_s)$. This relative position information means a relative position from the processing reference position to the central position of the object A. For this reason, in this embodiment, since the central position of the object A in images recorded in the registered orientation image database 10 is (100, 100), a relative position from the processing reference position to the central position of the object A is $(100-x_s, 100-y_s)$. The hypothesis information calculated in this way is one of those corresponding to the discrimination result sequence $R_s$ of the Fern discriminator generated by the discriminator generation unit 11. This processing is executed for all discrimination data (50000 (=1000×50) data in this embodiment) selected by the feature selection unit 19, and pieces of calculated hypothesis information are associated with respective discrimination result sequences. Then, the result is output together with pieces of information of Fern discriminators generated by the discriminator generation unit 11, thus ending the processing of this result output unit 110. Note that when no discrimination data corresponding to a certain discrimination result sequence is selected, it is determined that no hypothesis information corresponding to that discrimination result sequence exists.

With the above processing, pieces of hypothesis information corresponding to each discrimination result sequence of each Fern discriminator used in the aforementioned discrimination processing can be selected. As described above, in the feature selection method of this embodiment, a predetermined discriminator is generated in advance, and respective features are evaluated using that discriminator. Hence, features can be evaluated in consideration of an actual discrimination method, and evaluation scales of features are more likely to be those suited to the actual discrimination method. For this reason, feature selection that can improve final discrimination precision can be attained with a high possibility. When sufficient test data are not prepared like in this embodiment (although there are a large number of images, only one image exists for one orientation), it is difficult to attain feature selection using the Wrapper method or AdaBoost. However, with the feature selection method of this embodiment, feature selection can be attained in consideration of the actual discrimination method even in this case.

The pattern discrimination method, which uses features selected by the feature selection method according to this embodiment, can execute the aforementioned discrimination processing (that with the processing arrangement shown in FIG. 3) using the aforementioned Fern discriminators output from the result output unit 110. In this case, as pieces of hypothesis information corresponding to each discrimination result sequence of the Fern discriminator, those which are calculated from the discrimination data selected by the feature selection method of this embodiment are used. Note that the aforementioned discrimination processing uses a plurality of (50 in the above example) Fern discriminators. Hence, the aforementioned feature selection method of this embodiment is repetitively executed to generate a required number of Fern discriminators, and the generated discriminators can be used. Thus, since the discrimination processing using pieces of hypothesis information, which are selected in consideration of the discriminators to be used in practice, can be executed, the final discrimination precision is more likely to be improved compared to that which uses pieces of hypothesis information selected regardless of discriminators to be used in practice.

Second Embodiment

The second embodiment will exemplify a feature selection method which selects one discriminator from a plurality of discriminators and features used in that discriminator, as another embodiment of the feature selection method described in the first embodiment. Note that a description of components and processes of the second embodiment, which are the same as those in the first embodiment, will not be repeated as needed.

Figure 7:
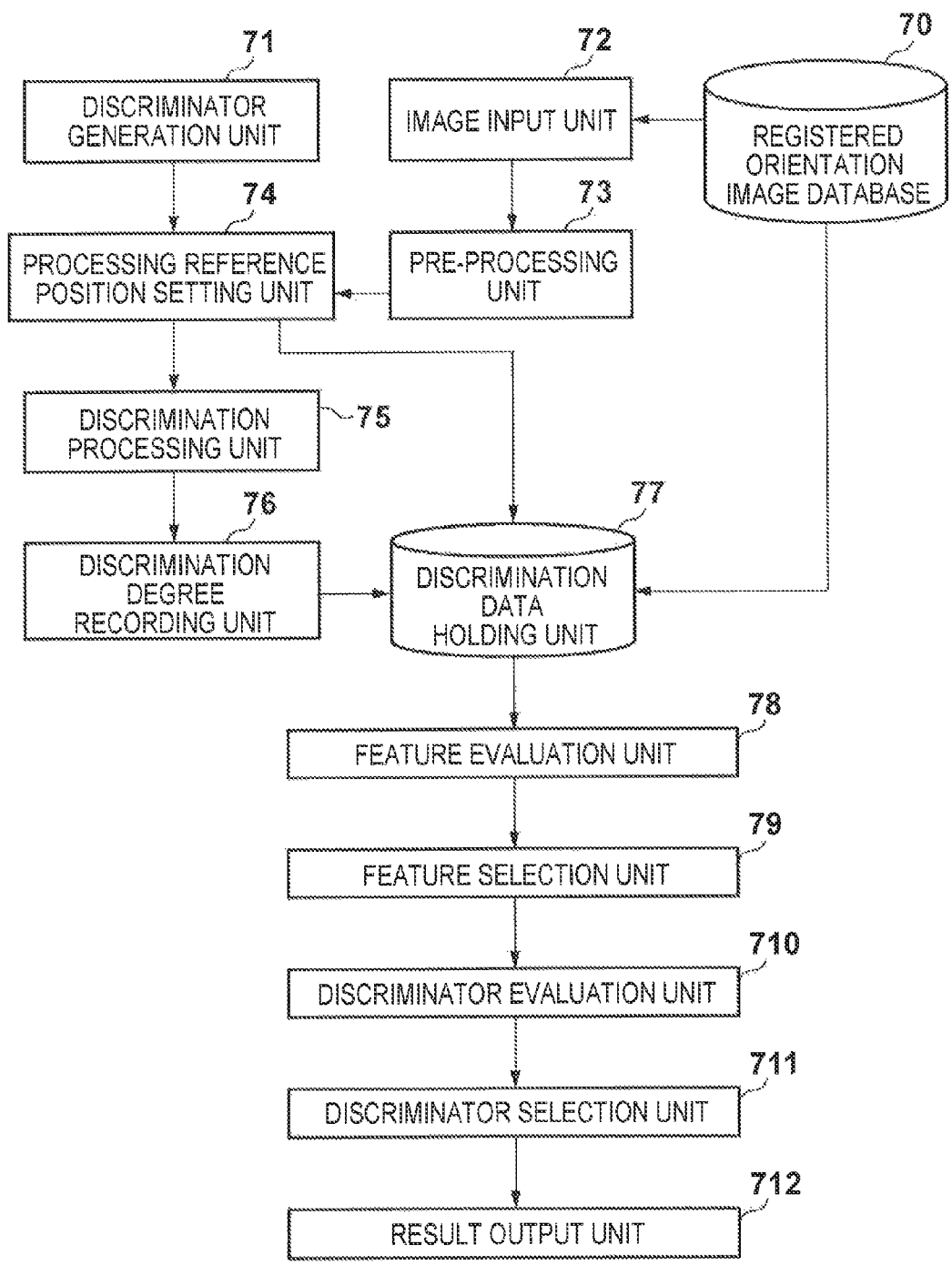
FIG. 7 is a block diagram showing the processing arrangement of a feature selection method according to the second embodiment.
Figure 8:
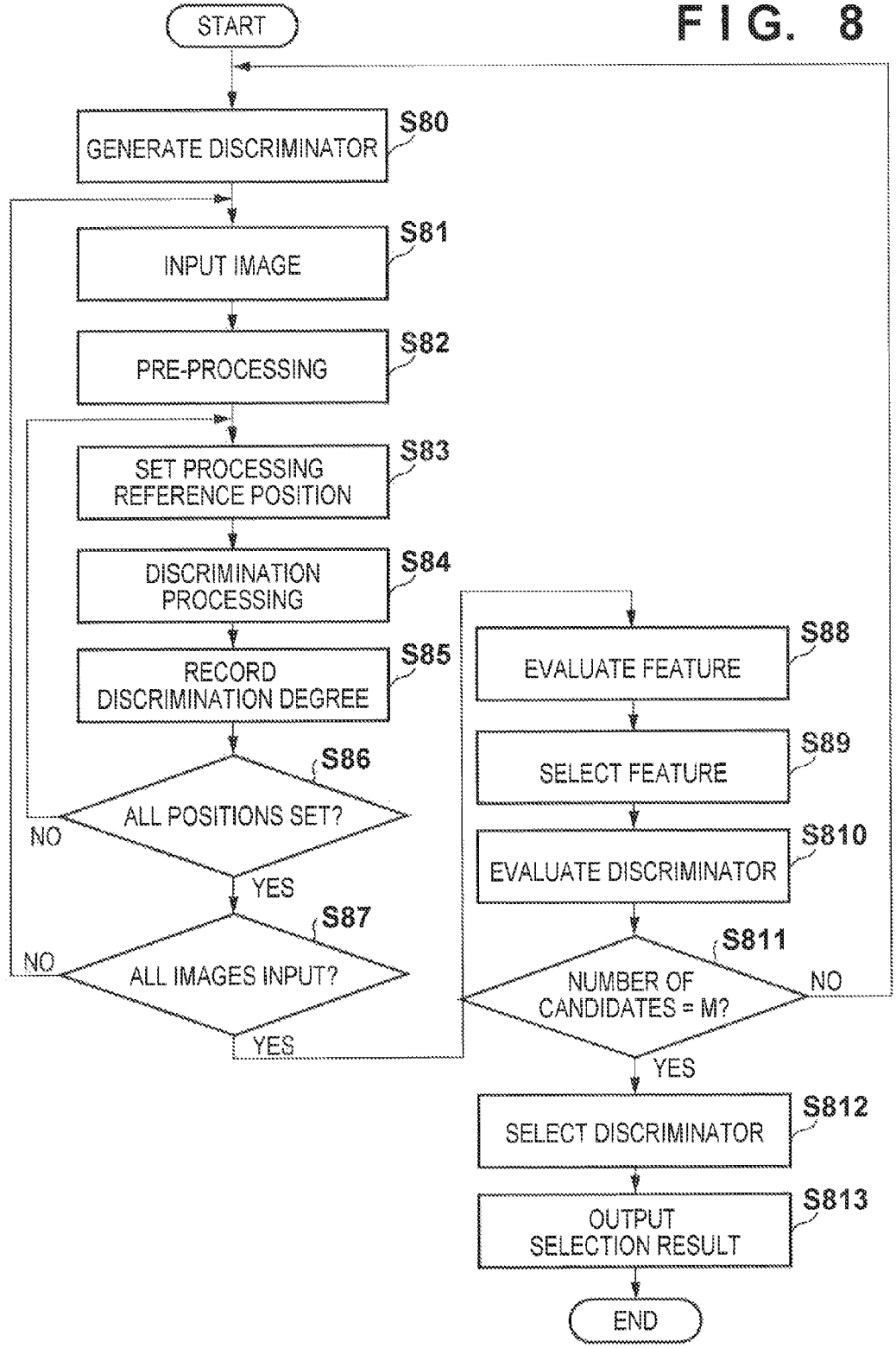
FIG. 8 is a flowchart showing processing of the feature selection method according to the second embodiment.

FIG. 7 is a block diagram showing the processing arrangement of a feature selection method according to the second embodiment. In this embodiment, feature selection processing for selecting pieces of hypothesis information to be associated with discrimination result sequences of a discriminator is executed as in the first embodiment. FIG. 8 is a flowchart showing the processing sequence of the feature selection method of the second embodiment. An example of the feature selection method of this embodiment will be described below with reference to FIGS. 7 and 8.

Since processing units from a registered orientation image database 70 to a feature selection unit 79 in FIG. 7 are the same as those from the registered orientation image database 10 to the feature selection unit 19 in FIG. 1 in the first embodiment, a description thereof will not be repeated. With the processes executed so far, a Fern discriminator generated by the discriminator generation unit 71 and pieces of hypothesis information corresponding to respective discrimination result sequences of that Fern discriminator are selected as in the first embodiment. The processes executed so far correspond to those in steps S80 (generate discriminator) to S89 (select feature) in FIG. 8, which are the same as steps S20 to S29.

In step S810, a discriminator evaluation unit 710 calculates a sum total of usefulness degrees (=discrimination degree/the number of discrimination data as the discrimination result sequence) as features, which correspond to discrimination data selected by the feature selection unit 79, and are calculated by the feature evaluation unit 78. In this embodiment as well, the number of images recorded in the registered orientation image database 70 is 1000, and top 50 discrimination data having higher usefulness degrees as features are selected per image. For this reason, the discriminator evaluation unit 710 calculates a sum total of usefulness degrees as features corresponding to 50000 (=1000×50) discrimination data selected by the feature selection unit 79. Since the sum total of the usefulness degrees as the features, which total is calculated in this step, indicates how many discrimination data with higher usefulness degrees as features can be selected, it can be used as an evaluation value of that discriminator. For this reason, a subsequent discriminator selection unit 711 selects a discriminator using this discriminator evaluation value, thus selecting a better discriminator.

After completion of the process in the discriminator evaluation unit 710, the control returns to the process in the discriminator generation unit 71 until the predetermined number M (for example, M=100) of candidates, which is set in advance, is reached. Then, a new discriminator is generated, and the processes up to the discriminator evaluation unit 710 are similarly repeated. The repetitive processing in this case corresponds to loop processing in step S811 as a branch process for checking whether or not "the number of candidates=M" in FIG. 8. With this loop processing, a total of M Fern discriminators, discrimination data selected in correspondence with these discriminators, and discriminator evaluation values calculated for respective discriminators by the discriminator evaluation unit 710 are obtained. Note that the discriminator evaluation value is the sum total of usefulness degrees as features corresponding to the selected discrimination data.

In step S812, the discriminator selection unit 711 executes processing for selecting one discriminator based on the M discriminator evaluation values obtained by the aforementioned processes. In this embodiment, processing for simply selecting a discriminator with the highest discriminator evaluation value from the M discriminators is executed. Note that one discriminator is selected in this embodiment, but two or more discriminators may be selected. That is, a predetermined number of (<M) discriminators may be selected in descending order of evaluation value.

Finally, in step S813, a result output unit 712 calculates pieces of hypothesis information corresponding to respective discrimination result sequences of the Fern discriminator selected by the discriminator selection unit 711. This processing is the same as that by the result output unit 110 in the first embodiment. Then, the result output unit 712 outputs these pieces of hypothesis information and information of the Fern discriminator selected by the discriminator selection unit 711 as a set.

With the above processing, one Fern discriminator can be selected from the plurality of Fern discriminators, and pieces of hypothesis information corresponding to respective discrimination result sequences of that Fern discriminator can be selected. As described above, according to the feature selection method of the second embodiment, using an evaluation value corresponding to selected features, a corresponding discriminator can also be evaluated. For this reason, as a result, feature selection that can improve final discrimination precision is more likely to be attained. From another viewpoint, the above discriminator selection in this embodiment is equivalent to selection of point positions to be referred to by the discriminator, and can be interpreted as selection of reference points to be used, that is, values of positions to be used as features.

A pattern discrimination method, which uses features selected by the feature selection method of the second embodiment, executes discrimination processing using the Fern discriminator output from the aforementioned result output unit 712 as in the first embodiment. Of course, as pieces of hypothesis information corresponding to respective discrimination result sequences of this Fern discriminator, those which are calculated from discrimination data selected by the feature selection method of this embodiment are used. A required number of Fern discriminators are generated and used by repetitively executing the aforementioned feature selection method of this embodiment, as in the first embodiment. Thus, discrimination processing using the pieces of hypothesis information selected in consideration of the discriminators to be used in practice can be executed as in the first embodiment. Since the discriminators for which better features can be selected are used, the final discrimination precision is more likely to be consequently improved.

Third Embodiment

The third embodiment will explain a modification of the method, which is required to select pieces of hypothesis information used for one discriminator and described in the first embodiment. Note that this embodiment is the same as the first embodiment, except for the processing in the feature selection unit 19 in FIG. 1. Hence, in the third embodiment, only this different part will be explained, and a description of other parts will not be given. Since the block diagram showing the processing arrangement of the feature selection method of this embodiment and the processing sequence are the same as those of the feature selection method of the first embodiment, an example of the feature selection method of this embodiment will be described below using FIGS. 1 and 2.

The processing units from the registered orientation image database 10 to the feature evaluation unit 18 are quite the same as those in the first embodiment. With the processes executed so far, a large number of discrimination data are recorded in the discrimination data holding unit 17, and usefulness degrees as features of all the recorded discrimination data are calculated as in the first embodiment. The processes executed so far correspond to those from the discriminator generation step S20 to the feature evaluation step S28 in FIG. 2.

In step S29, the feature selection unit 19 selects discrimination data to be used as pieces of hypothesis information to be associated with respective discrimination result sequences based on helpfulness degrees as features of respective discrimination data, which are calculated by the feature evaluation unit 18, as in the first embodiment. In the first embodiment, discrimination data of the predetermined number are selected for each of all the images recorded in the registered orientation image database 10. However, in the third embodiment, discrimination data are selected for each discrimination result sequence. More specifically, of discrimination data corresponding to identical ones for all discrimination result sequences, that having the highest usefulness degree as a feature, which is calculated by the feature evaluation unit 18, is selected as discrimination data corresponding to that discrimination result sequence. Since a Fern discriminator of this embodiment also includes 16 element discriminators, corresponding discrimination data are selected for $2^{16}=65536$ different discrimination result sequences. Since the 65536 different discrimination result sequences include those for which no corresponding discrimination data is recorded in the discrimination data holding unit 17, a maximum of 65536 discrimination data are selected by the process in this step. The process in this step corresponds to the feature selection step S29 in FIG. 2.

By selecting discrimination data for respective discrimination result sequences like in this embodiment, discrimination data are selected in a balanced manner for all discrimination result sequences, thus consequently generating a Fern discriminator with high information efficiency. Note that in this embodiment, only discrimination data with the maximum usefulness degree as a feature is selected as that corresponding to a given discrimination result sequence. However, for example, discrimination data having top usefulness degrees as features of the predetermined number may be selected, or discrimination data having usefulness degrees as features, which assume values equal to or larger than a predetermined ratio (for example, 0.8 times or more) or more with respect to the maximum usefulness degree as a feature may be selected.

Finally, in step S210, the result output unit 110 calculates pieces of hypothesis information corresponding to respective discrimination result sequences of the Fern discriminator based on the discrimination data selected by the feature selection unit 19 as in the first embodiment. Then, the result output unit 110 outputs these pieces of hypothesis information and information of the Fern discriminator as a set.

With the aforementioned processing, according to the third embodiment, pieces of hypothesis information corresponding to respective discrimination result sequences of the Fern discriminator can be selected as in the first embodiment. In the third embodiment as well, since respective features are evaluated using the discriminator generated in advance, feature selection which can consequently improve the final discrimination precision is more likely to be attained. As described above, since the third embodiment can generate the Fern discriminator in a balanced manner, the Fern discriminator with high information efficiency can be generated.

The process in the feature selection unit 19 of the third embodiment relatively compares usefulness degrees as features between discrimination data as identical discrimination result sequences. For this reason, in practice, the usefulness degree as a feature need not be calculated by dividing a discrimination degree by the number of discrimination data as identical discrimination result sequences unlike in the first embodiment, and the selection result remains the same even when a discrimination degree of each discrimination data is used intact as a usefulness degree as a feature. However, when one of a plurality of discriminators is selected using the sum total of the usefulness degrees as features as in the second embodiment, it is preferable to calculate a usefulness degree as a feature by dividing a discrimination degree by the number of discrimination data as identical discrimination result sequences.

Note that a pattern discrimination method using features selected by the feature selection method of the third embodiment is the same as that in the first embodiment, except that the result output from the result output unit 110 of the third embodiment is used.

Fourth Embodiment

The fourth embodiment will explain an example of a method of selecting pieces of hypothesis information used for a discriminator as in other embodiments. The fourth embodiment uses a linear binary discriminator in place of a Fern discriminator unlike in other embodiments. The linear binary discriminator is that which calculates an inner product of a predetermined base vector w and input vector z, and outputs one of $\{0, 1\}$ according to the inner product value. In the fourth embodiment, dimensions of the base vector are $21 \times 21 = 441$ dimensions, and the input vector z is a (441)-dimensional vector obtained by arranging values of a region of $21 \times 21$ pixels having a processing reference position as the center in a raster scan order. Then, in the fourth embodiment, an inner product value of this base vector w and input vector z is calculated, and if that value is equal to or smaller than 0, 0 is output; otherwise, 1 is output. The discriminator of the fourth embodiment refers to 441 data, which are larger than those to be referred to in the aforementioned first to third embodiments. However, since original data includes $200 \times 200$ pixels=40000 data, discrimination using only limited features is executed compared to that data.

Discrimination processing using this discriminator is basically the same as that described in the first embodiment. However, in the aforementioned discrimination processing, a Fern discriminator is applied to each processing reference position to calculate a discrimination result sequence. However, in the fourth embodiment, one of values $\{0, 1\}$ is calculated using the linear binary discriminator. Then, with reference to the number of hypotheses according to this output, and pieces of hypothesis information as many as the number of hypotheses, those pieces of information are cumulatively recorded. That is, a difference lies in only whether or not the cumulative recording processing of hypothesis information is executed based on a discrimination result sequence of the Fern discriminator or an output result of $\{0, 1\}$ of the linear binary discriminator. For this reason, the feature selection method of this embodiment selects which hypothesis information is to be associated with each output $\{0, 1\}$ of the linear binary discriminator.

Figure 9:
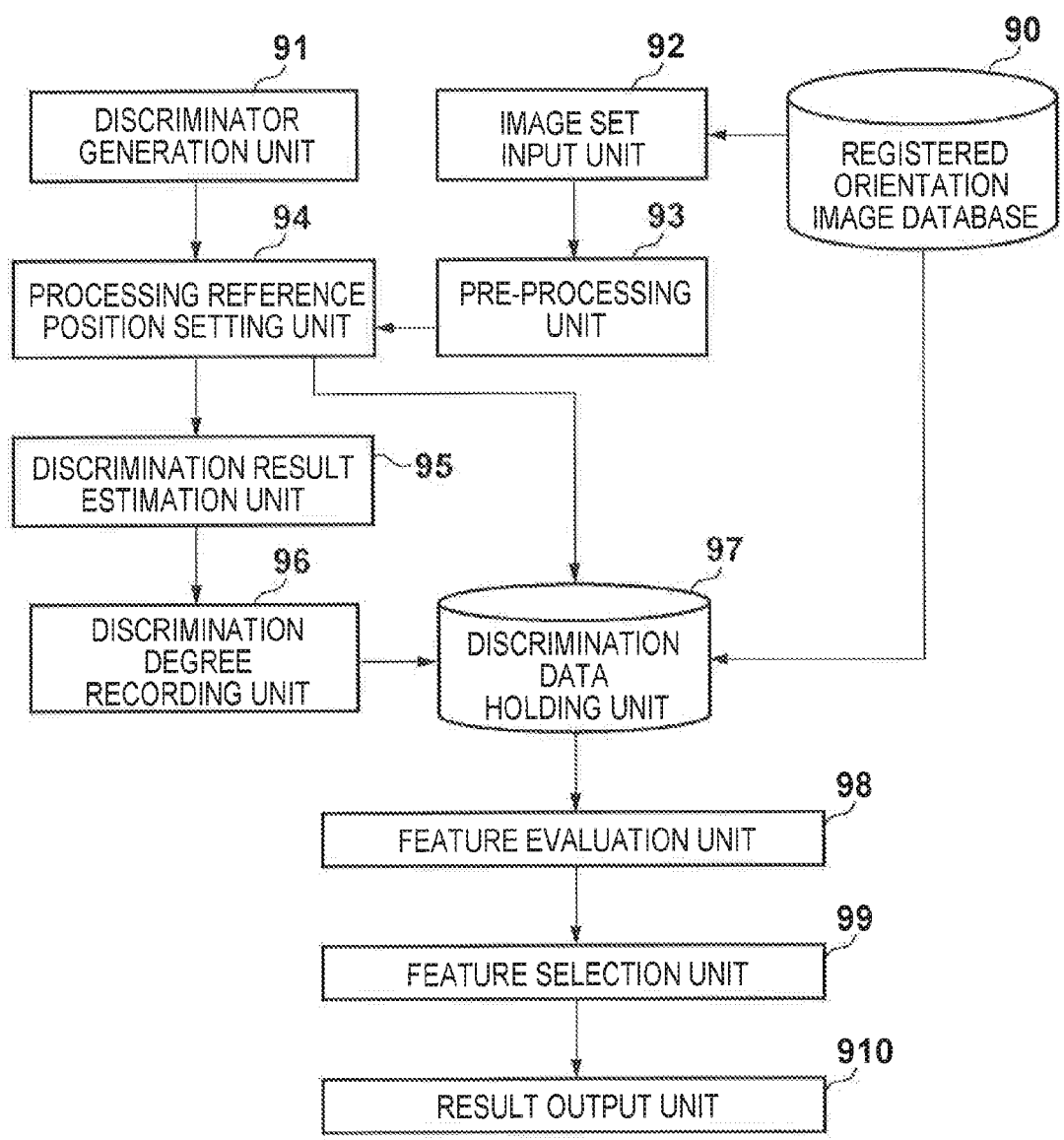
FIG. 9 is a block diagram showing the processing arrangement of a feature selection method according to the fourth embodiment.
Figure 10:
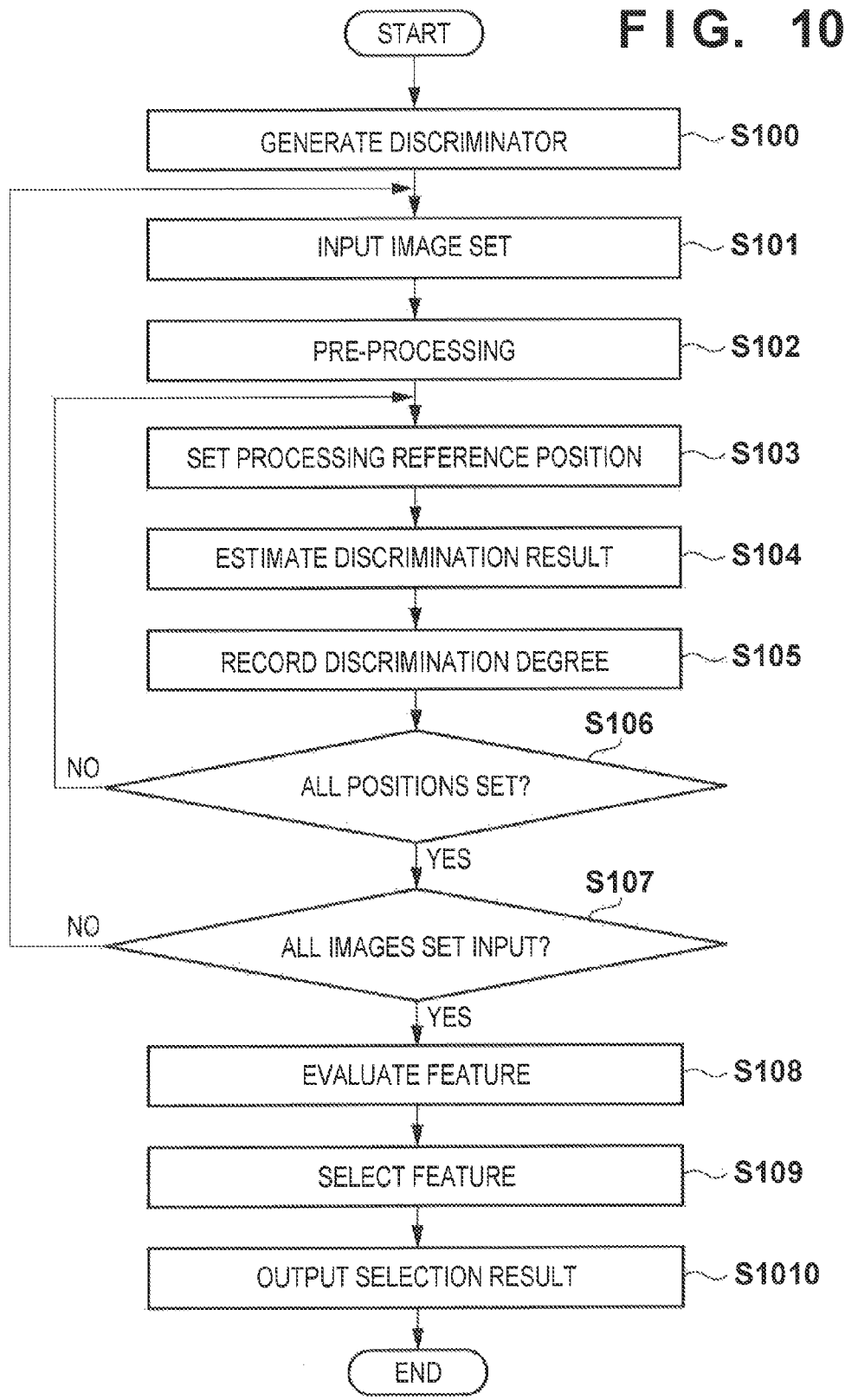
FIG. 10 is a flowchart showing processing of the feature selection method according to the fourth embodiment.

FIG. 9 is a block diagram showing the processing arrangement of the feature selection method of the fourth embodiment, that is, the method of selecting pieces of hypothesis information to be associated with a discrimination result sequence of the discriminator. Also, FIG. 10 is a flowchart showing the processing sequence of the feature selection method of the fourth embodiment. An example of the feature selection method of the fourth embodiment will be described below with reference to FIGS. 9 and 10. Note that a description of components and processes of the fourth embodiment, which are the same as those of the first embodiment, will not be repeated as needed.

A registered orientation image database 90 records images obtained by capturing an object A as an object to be discriminated from various directions, and pieces of their relative orientation information as in the first embodiment. However, in the registered orientation image database 10 of the first embodiment, one image is recorded in correspondence with one relative orientation. However, in the fourth embodiment, a plurality of images are recorded in correspondence with one relative orientation. More specifically, in the fourth embodiment, 10 images are recorded in correspondence with one relative orientation. These 10 images are those which are captured to have the same relative orientation by changing image capturing conditions such as illumination. If the number of pieces of relative orientation information recorded in the registered orientation image database 90 is 1000 as in the first embodiment, a total of 10000 (=1000×10) images are recorded in the registered orientation image database 90 in the fourth embodiment.

In step S100, a discriminator generation unit 91 generates the aforementioned linear binary discriminator. In this embodiment, a linear binary discriminator, which uses a random vector obtained by randomly setting respective elements of a (441)-dimensional vector as its base vector w, is generated.

In step S101, an image set input unit 92 inputs one set of image data recorded in the registered orientation image database 90 in turn set by set. One set in this case includes a plurality of images having the same relative orientation, that is, one set includes 10 images in this embodiment, as described above.

In step S102, a pre-processing unit 93 applies smoothing processing and edge extraction processing as in the first embodiment to each of images in the image set input by the image set input unit 92, thereby generating a pre-processed image set. The processes such as the smoothing processing are the same as those in the first embodiment, and a detailed description thereof will not be repeated.

In step S103, a processing reference position setting unit 94 sets a processing reference position in processing of a subsequent discrimination result estimation unit 95 in the same manner as in the processing reference position setting unit 14 of the first embodiment. The processing reference position set in this step is common to respective pre-processed images in the pre-processed image set generated by the pre-processing unit 93.

In step S104, a discrimination result estimation unit 95 applies discrimination processing using the linear binary discriminator generated by the discriminator generation unit 91 to the respective pre-processed images of the pre-processed image set generated by the pre-processing unit 93 at the processing reference position set by the processing reference position setting unit 94. Then, the discrimination result estimation unit 95 estimates which of {0, 1} discrimination results at the processing reference position assume with a higher possibility, and calculates an output result with the higher possibility as an estimated output result. More specifically, the discrimination result estimation unit 95 calculates, for each pre-processed image, an inner product of the vector z obtained by arranging values of a region of 21×21 pixels having the processing reference position as the center in a raster scan order, and the base vector w of the linear binary discriminator generated by the discriminator generation unit 91. Then, the unit 95 calculates an average of the inner products calculated for the respective images (10 images in this embodiment), and outputs a result "0" as an estimated output result when the average value is equal to or smaller than 0; it outputs a result "1" as the estimated output result when the average value is larger than 0. In this manner, according to the fourth embodiment, processing is applied to a plurality of data at one processing reference position, and results are combined to estimate the estimated output result having a high possibility as an output result of the discriminator.

In step S105, a discrimination degree recording unit 96 calculates a discrimination degree associated with the estimated output result calculated by the discrimination result estimation unit 95, and records it in a discrimination data holding unit 97. The discrimination degree in this step represents a likelihood with respect to the estimated output result calculated by the discrimination result estimation unit 95 as in the first embodiment. In the fourth embodiment, the inner product values of the base vector of the linear binary discriminator and the input vectors at the processing reference position are considered as probability variables, and are modeled under the assumption that their distribution is a normal distribution. Then, based on this model, a probability value of obtaining the estimated output result calculated by the discrimination result estimation unit 95 is calculated, and is used as a discrimination degree.

More specifically, this probability value is calculated as follows. Based on the inner product values, which are calculated by the discrimination result estimation unit 95 and correspond to the respective pre-processed images, their variance $\sigma^2$ is calculated. Letting $\{a_i\}$ (i=1, 2, . . . , n) be an inner product value which is calculated by the discrimination result estimation unit 95 and corresponds to each pre-processed image, and $\mu$ be an average value of the inner product values, this variance is calculated by:

$$\sigma^2 = \frac{1}{n-1} \sum_{i=1}^{n} (\mu - a_i)^2 \qquad (1)$$

Note that in this embodiment, n=10, as described above.

Next, a Mahalanobis distance D to a boundary at which an output from the discriminator changes is calculated from the average value g of the inner product values. In this embodiment, since the output of the discriminator changes to have an inner product value=0 as a boundary, the Mahalanobis distance from the average value $\mu$ to 0 is calculated. The Mahalanobis distance can be calculated by simply dividing a distance $|\mu-0|=|\mu|$ from the average value $\mu$ to 0 by a standard deviation (a square root of a variance) since the inner product values are one-dimensional values. That is, the Mahalanobis distance D to the boundary where the output of the discriminator changes is $D=|\mu|/\sigma$. Finally, a probability value p of obtaining the estimated output result calculated by the discrimination result estimation unit 95 is calculated by:

$$p = \int_{-\infty}^{D} \frac{1}{\sqrt{2\pi}} \exp\left(-\frac{x^2}{2}\right) dx \qquad (2)$$

The probability value p calculated in this way is used as a discrimination degree associated with the estimated output result calculated by the discrimination result estimation unit 95. The discrimination degree recording unit 96 records, in the discrimination data holding unit 97, relative orientation information corresponding to the image set which has undergone the estimation of the discriminator, and the processing reference position, as in the first embodiment, together with this discrimination degree and the estimated output result. As described above, according to the fourth embodiment, a distribution is estimated using a plurality of data, and a probability value of obtaining an estimated output result is calculated based on the distribution and is used as a discrimination degree. In this way, the discrimination degree in the feature selection method of the present invention can be calculated not only by the method of calculating the discrimination degree from one data but also using a plurality of data.

In the fourth embodiment, the linear binary discriminator outputs a discrimination result based on the inner product values with the base vector. For this reason, a discrimination space defined by this linear binary discriminator can be considered as a one-dimensional space having the inner product values with the base vector as an axis, that is, a linear mapping space based on the base vector. Then, the output of the linear binary discriminator of the fourth embodiment changes to have an origin of this one-dimensional space, that is, an inner product value=0 as a boundary. For this reason, it is interpreted that the discrimination degree is calculated based on a Mahalanobis distance between an average value obtained when the plurality of data are mapped on the discrimination space, and the origin of the discrimination space, that is, the boundary point where the output of the discriminator changes. Since the Mahalanobis distance is a distance scale in consideration of a data distribution, the discrimination degree is also calculated based on the relationship between the data distribution and the boundary point where the output of the discriminator changes.

The aforementioned processes in the discrimination result estimation unit 95 and discrimination degree recording unit 96 are repetitively executed for one image set while changing the processing reference position as in the first embodiment. The repetitive processing in this case corresponds to loop processing in step S106 which executes a branch process based on whether or not settings of all positions are complete in FIG. 10. With this loop processing, a large number of discrimination data are recorded in the discrimination data holding unit 97 as in the first embodiment. Furthermore, as in the first embodiment, the loop processing for one image set is repetitively executed for all image sets recorded in the registered orientation image database 90. Another repetitive processing in this case corresponds to loop processing in step S107 which executes a branch process based on whether or not processing is complete for all image sets in FIG. 10.

In step S108, a feature evaluation unit 98 calculates usefulness degrees as features respectively for a large number of discrimination data recorded in the discrimination data holding unit 97 as in the first embodiment. In the first embodiment, the usefulness degree is calculated by dividing a discrimination degree of each discrimination data by the number of discrimination data as identical discrimination result sequences. However, in the fourth embodiment, the discrimination degree of each discrimination data is simply used intact as a usefulness degree as a feature.

In step S109, a feature selection unit 99 selects hypothesis information to be associated with each output {0, 1} of the linear binary discriminator generated by the discriminator generation unit 91 based on the usefulness degrees as features of the respective discrimination data, which degrees are calculated by the feature evaluation unit 98. In the fourth embodiment, discrimination data of the predetermined number are selected for each output as in the third embodiment. In this case, discrimination data of the predetermined number are randomly selected using a probability based on the magnitudes of the usefulness degrees as features in place of selection in descending order of usefulness degree as a feature. More specifically, in the fourth embodiment, 20 discrimination data are randomly selected without permitting any overlaps in accordance with a probability proportional to the usefulness degrees as features from the discrimination data as identical estimated output results. Since the estimated output result of the fourth embodiment is {0, 1}, 20 discrimination data are selected respectively for 0 and 1, that is, a total of 40 discrimination data are selected.

Finally, in step S1010, a result output unit 910 calculates pieces of hypothesis information corresponding to outputs {0, 1} of the linear binary discriminator based on the discrimination data selected by the feature selection unit 99 as in other embodiments. Then, the result output unit 910 outputs these pieces of hypothesis information and information of that linear binary discriminator as a set.

With the aforementioned processing, pieces of hypothesis information corresponding to outputs of the linear binary discriminator can be selected. In the fourth embodiment as well, since respective features are evaluated using the discriminator, which is generated in advance, feature selection, which can consequently improve the final discrimination precision, is more likely to be achieved. In this manner, the feature selection method of the present invention can be implemented not only by the Fern discriminator in the first embodiment and the like but also by other discriminators. Note that when a plurality of discriminators (50 discriminators in the example described above using FIGS. 3 and 4) are used in discrimination processing, the feature selection method of the fourth embodiment is repetitively executed to generate a required number of linear binary discriminators, and to use them.

Also, the following aspect can be carried out. That is, the linear binary discriminator of this embodiment is considered as one element discriminator, and a plurality of these discriminators are coupled to specify one discriminator, and a discrimination result sequence obtained by arranging output results of these linear binary discriminators is used as an output of that discriminator. In this case, a discrimination degree calculated by the discrimination degree recording unit 96 is used as an element discrimination degree, and element discrimination degrees obtained by a plurality of linear binary discriminators are combined to calculate an overall discrimination degree. As a combining method, a method of simply calculating a sum total of element discrimination degrees as in the first embodiment may be used. However, in the fourth embodiment, since the probability value is used, it is preferable to calculate a product of respective element discrimination degrees.

Furthermore, in the above embodiment, a discriminator whose discrimination value is a binary value, is used. However, the present invention is not limited to this, and a multi-value output discriminator may be used. In this case as well, as in the above embodiments, a value similar to a likelihood of a result obtained by that discriminator is calculated as a discrimination degree, and features can be selected using the calculated values. Also, like in the processing in the feature selection unit 99 of this embodiment, features may be randomly selected using a probability according to the magnitudes of usefulness degrees as features in place of simply selecting features in descending order of usefulness degree as a feature.

Note that all the aforementioned embodiments have explained the example of a discriminator used in processing for estimating a position and orientation of a specific object included in an image. However, the feature selection method of the present invention is not limited to this. For example, the feature selection method of the present invention is applicable to a method of selecting features used in a discriminator used in processing for identifying a person based on face images of persons. All the aforementioned embodiments have exemplified a so-called multi-class problem. However, since a so-called 2-class problem can be considered as a special case of the multi-class problem, this feature selection method is applicable to the 2-class problem, needless to say.

All the aforementioned embodiments have exemplified the feature selection method for two-dimensional images. However, the present invention is not limited to two-dimensional images. For example, the present invention is applicable to, for example, other attribute data such as one-dimensional audio data and three-dimensional volume data.

According to the present invention, even when sufficient test data do not exist, features suited to pattern discrimination can be selected from features included in data with lower processing cost. Also, data to be discriminated is classified into a predetermined class using features selected in this way, thus allowing pattern discrimination using appropriate partial features.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, non-transitory computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-094372, filed Apr. 20, 2011, which is hereby incorporated by reference herein in its entirety.

What is claimed is:

1. A method comprising:
   preparing a discriminator to be used for discriminating partial data;
   extracting a plurality of partial data from learning data;
   extracting at least one local data in each of the plurality of partial data;
   classifying the plurality of partial data by the discriminator to obtain a discrimination degree related to a difference between the at least one local data and a decision boundary of the discriminator for each of the plurality of partial data;
   evaluating a usefulness degree of the extracted partial data based on the discrimination degree;
   selecting at least a portion of the plurality of partial data to be used to be associated with the discriminator from the plurality of partial data based on the usefulness degree; and
   recording information of the selected partial data as an example to the discriminator.

2. The method according to claim 1, wherein a plurality of discriminators are prepared by setting different discrimination rules in the discriminator,
   wherein at least one local data is extracted for each of the plurality of discriminators based on the set different discrimination rules.

3. The method according to claim 2, further comprising evaluating each of the plurality of discriminators based on the usefulness degrees obtained by the plurality of discriminators, and selecting a predetermined number of discriminators from the plurality of discriminators in descending order of evaluation result.

4. The method according to claim 1, wherein the discriminator includes a plurality of element discriminators, each of which outputs an output value as a result of classification, and
   wherein the discriminator obtains, as a discrimination value, a sequence in which a plurality of output values from the plurality of element discriminators are arranged.

5. The method according to claim 4, wherein in obtaining the discrimination degree,
   an individual discrimination degree is calculated for each of the plurality of output values using a classification space defined by the plurality of element discriminators, and
   a sum total of the individual discrimination degrees is calculated as the discrimination degree.

6. The method according to claim 4, wherein the usefulness degree is obtained based on the discrimination degree and uniqueness of the discrimination value.

7. The method according to claim 4, wherein the plurality of element discriminators calculate intermediate processing results by applying predetermined processing to a partial data extracted from the learning data, and the discrimination degree is obtained by calculating a distance between an origin of a discrimination space and a point indicating the intermediate processing results in the discrimination space, wherein the discrimination space is a space which expresses the intermediate processing results.

8. The method according to claim 1, wherein the discriminator is a linear binary discriminator which outputs a discrimination value based on an inner product of a base vector and an input vector generated based on the partial data extracted from the learning data,
   wherein, the discrimination value is obtained based on an average value of a plurality of inner product values obtained by applying the discriminator to the plurality of partial data, and
   wherein, in obtaining the discrimination degree, a distribution of the plurality of inner product values is estimated on a discrimination space defined by the discriminator, and the discrimination degree is calculated by calculating a relationship between a boundary where a discrimination value changes and the average value on the discrimination space based on the estimated distribution.

9. The method according to claim 1, further comprising associating a relative position of the selected partial data with respect to a predetermined position in the learning data.

10. The method according to claim 9, wherein the predetermined position corresponds to a position of an object to be detected.

11. The method according to claim 9, wherein the learning data includes an object to be detected, and the relative position of the selected partial data includes information indicating an orientation of the object in the learning data.

12. The method according to claim 1, wherein the usefulness degree is calculated based on discrimination values and the discrimination degrees obtained by applying the discriminator to the partial data.

13. The method according to claim 1, wherein the learning data is a learning image, and the partial data is a partial image, and the local data comprises pixel values extracted from the partial image.

14. The method according to claim 13, wherein the discrimination degree is a value related to a distance between the pixel value and a discrimination boundary line.

15. The method according to claim 1, wherein the usefulness degree is obtained based on the discrimination degree and a number of partial data that provides the same discrimination result.

16. A pattern discrimination method for discriminating an object in data, the method comprising:
obtaining discrimination values by applying a discriminator, which has been trained using partial data selected by a training method, to a plurality of partial data obtained from the data; and
classifying the data to a predetermined class based on the obtained discrimination values,
wherein the training method comprises:
extracting a plurality of partial data from a learning data;
extracting at least one local data in each of the plurality of partial data;
classifying the plurality of partial data by the discriminator to obtain a discrimination degree related to a difference between the at least one local data and a decision boundary of the discriminator for each of the plurality of partial data;
evaluating a usefulness degree of the extracted partial data based on the discrimination degree;
selecting at least a portion of the plurality of partial data to be used to be associated with the discriminator from the plurality of partial data based on the usefulness degree; and
recording information of the selected partial data as an example to the discriminator.

17. An apparatus comprising:
a processor; and
a memory storing instructions that, when executed by the processor, cause the processor to:
prepare a discriminator to be used for discriminating partial data;
extract a plurality of partial data from a learning data;
extract at least one local data in each of the plurality of partial data;
classify the plurality of partial data by the discriminator to obtain a discrimination degree related to a difference between the at least one local data and a decision boundary of the discriminator for each of the plurality of partial data;
evaluate a usefulness degree of the extracted partial data based on the discrimination degree;
select at least a portion of the plurality of partial data to be used to be associated with the discriminator from the plurality of partial data based on the usefulness degree; and
record information of the selected partial data as an example to the discriminator.

18. A pattern discrimination apparatus for discriminating an object in data, the pattern discrimination apparatus comprising:
a first processor; and
a first memory storing instructions that, when executed by the first processor, cause the first processor to:
obtain discrimination values by applying a discriminator, which has been trained using partial data selected by a training method, to a plurality of partial data obtained from the data; and
classify the data to a predetermined class based on the obtained discrimination values,
wherein the training method comprises:
extracting a plurality of partial data from learning data;
extracting at least one local data in each of the plurality of partial data;
classifying the plurality of partial data by the discriminator to obtain a discrimination degree related to a difference between at least one local data and a decision boundary of the discriminator for each of the plurality of partial data;
evaluating a usefulness degree of the extracted partial data based on the discrimination degree;
selecting at least a portion of the plurality of partial data to be used to be associated with the discriminator from the plurality of partial data based on the usefulness degree; and
recording information of the selected partial data as an example to the discriminator.

19. A non-transitory computer-readable storage medium storing a program for controlling a computer to execute a method comprising:
preparing a discriminator to be used for discriminating partial data extracting a plurality of partial data from learning data;
extracting at least one local data in each of the plurality of partial data;
classifying the plurality of partial data by the discriminator to obtain a discrimination degree related to a difference between the at least one local data and a decision boundary of the discriminator for each of the plurality of partial data;
evaluating a usefulness degree of the extracted partial data based on the discrimination degree;
selecting at least a portion of the plurality of partial data to be used to be associated with the discriminator from the plurality of partial data based on the usefulness degree; and
recording information of the selected partial data as an example to the discriminator.

20. A non-transitory computer-readable storage medium storing a program for controlling a computer to execute a pattern discrimination method comprising:
extracting a plurality of partial data from learning data;
extracting at least one local data in each of the plurality of partial data;

classifying the plurality of partial data by a discriminator to obtain a discrimination degree related to a difference between the at least one local data and a decision boundary of the discriminator for each of the plurality of partial data;

evaluating a usefulness degree of the extracted partial data based on the discrimination degree;

selecting at least a portion of the plurality of partial data to be used to be associated with the discriminator from the plurality of partial data based on the usefulness degree;

recording information of the selected partial data as an example to the discriminator;

obtaining discrimination values by applying the discriminator, which has been trained using the selected partial data, to a plurality of partial data obtained from the data; and classifying the data to a predetermined class based on the obtained discrimination values.

* * * * *